ись

United States Patent
Sinha et al.

(10) Patent No.: US 11,353,853 B2
(45) Date of Patent: Jun. 7, 2022

(54) SYSTEMS AND METHODS FOR REAL-TIME DETECTION AND COMMUNICATION OF HEALTH AND PERFORMANCE DEGRADATION IN A DISTRIBUTED BUILDING AUTOMATION NETWORK

(71) Applicant: Johnson Controls Tyco IP Holdings LLP, Milwaukee, WI (US)

(72) Inventors: Sudhi Sinha, Milwaukee, WI (US); Youngchoon Park, Brookfield, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 17/003,063

(22) Filed: Aug. 26, 2020

(65) Prior Publication Data

US 2021/0048797 A1    Feb. 18, 2021

Related U.S. Application Data

(63) Continuation of application No. 16/153,266, filed on Oct. 5, 2018, now Pat. No. 10,761,516, which is a
(Continued)

(51) Int. Cl.
*H04L 12/26* (2006.01)
*G05B 19/418* (2006.01)
(Continued)

(52) U.S. Cl.
CPC ......... *G05B 19/4184* (2013.01); *G05B 15/02* (2013.01); *G05B 19/048* (2013.01);
(Continued)

(58) Field of Classification Search
CPC .. H04L 43/0817; H04L 43/06; H04L 43/0811; H04L 41/0696; H04L 41/0677;
(Continued)

(56) References Cited

U.S. PATENT DOCUMENTS 9,811,249 B2   11/2017   Chen et al.
10,171,297 B2   1/2019   Stewart et al.
(Continued)

FOREIGN PATENT DOCUMENTS

AU   2019226217 A1   11/2020
AU   2019226264 A1   11/2020
(Continued)

*Primary Examiner* — Le H Luu
(74) *Attorney, Agent, or Firm* — Foley & Lardner LLP

(57) ABSTRACT

A building device for a building management system (BMS) includes a processing circuit configured to receive one or more health messages from one or more other building devices. The processing circuit is configured to update an existing health message stored in a memory of the building device based on the one or more health messages by updating a message list of the existing health message with message list data of the one or more health messages, updating a sick node list of the existing health message based on the updated message list, and updating a sick node matrix of the existing health message based on the updated sick node list and the received one or more health messages. The processing circuit is configured to communicate the updated health message to at least one of the one or more other building devices.

20 Claims, 14 Drawing Sheets

Related U.S. Application Data continuation-in-part of application No. 15/342,079, filed on Nov. 2, 2016, now Pat. No. 10,097,435.

(51) Int. Cl.
  *G05B 19/4065* (2006.01)
  *G05B 19/048* (2006.01)
  *G05B 15/02* (2006.01)
  *G05B 19/042* (2006.01)
  *H04L 43/06* (2022.01)
  *H04L 43/0811* (2022.01)
  *H04L 41/0604* (2022.01)
  *H04L 43/0817* (2022.01)
  *H04L 12/28* (2006.01)

(52) U.S. Cl.
  CPC ..... *G05B 19/0428* (2013.01); *G05B 19/4065* (2013.01); *H04L 12/2803* (2013.01); *H04L 41/0609* (2013.01); *H04L 43/06* (2013.01); *H04L 43/0811* (2013.01); *H04L 43/0817* (2013.01); *G05B 2219/2614* (2013.01); *G05B 2219/2642* (2013.01)

(58) Field of Classification Search
  CPC ............. H04L 41/0681; H04L 12/2803; H04L 12/2678; H04L 67/1002; H04L 67/38; G05B 15/02; G05B 19/0428; G05B 19/048; G05B 19/4065; G05B 19/4184; G05B 2219/2641; G05B 2219/2642; H02M 3/156
  See application file for complete search history.

(56) References Cited

U.S. PATENT DOCUMENTS

| | | | |
|---|---|---|---|
| 10,564,993 B2 | 2/2020 | Deutsch et al. | |
| 10,760,815 B2 | 9/2020 | Janakiraman et al. | |
| 10,762,475 B2 | 9/2020 | Song et al. | |
| 10,824,120 B2 | 11/2020 | Ahmed | |
| 10,845,771 B2 | 11/2020 | Harvey | |
| 10,921,760 B2 | 2/2021 | Harvey | |
| 10,969,133 B2 | 4/2021 | Harvey | |
| 11,041,650 B2 | 6/2021 | Li et al. | |
| 11,054,796 B2 | 7/2021 | Holaso | |
| 2007/0180077 A1* | 8/2007 | Letca | H04L 43/0817 709/223 |
| 2008/0040628 A1* | 2/2008 | Mandal | H04L 43/103 714/4.1 |
| 2009/0063509 A1* | 3/2009 | Lockhart | H04L 43/0876 |
| 2011/0047230 A1* | 2/2011 | McGee | H04L 43/10 709/206 |
| 2013/0338970 A1 | 12/2013 | Reghetti | |
| 2014/0310417 A1* | 10/2014 | Sorenson, III | H04L 45/24 709/226 |
| 2016/0014073 A1* | 1/2016 | Reddy | G06F 9/4416 713/2 |
| 2016/0247129 A1 | 8/2016 | Song et al. | |
| 2016/0260063 A1 | 9/2016 | Harris et al. | |
| 2016/0357521 A1 | 12/2016 | Zhang et al. | |
| 2017/0271984 A1* | 9/2017 | Kohn | G05B 15/02 |
| 2018/0356775 A1 | 12/2018 | Harvey | |
| 2018/0359111 A1 | 12/2018 | Harvey | |
| 2019/0121801 A1 | 4/2019 | Jethwa et al. | |
| 2019/0377306 A1 | 12/2019 | Harvey | |
| 2020/0336328 A1 | 10/2020 | Harvey | |
| 2020/0348632 A1 | 11/2020 | Harvey | |
| 2020/0387576 A1 | 12/2020 | Brett et al. | |
| 2020/0396208 A1 | 12/2020 | Brett et al. | |
| 2021/0043221 A1 | 2/2021 | Yelchuru et al. | |
| 2021/0325070 A1 | 10/2021 | Endel et al. | |
| 2021/0342961 A1 | 11/2021 | Winter et al. | |
| 2022/0121965 A1 | 4/2022 | Chatterji et al. | |

FOREIGN PATENT DOCUMENTS

| | | |
|---|---|---|
| AU | 2019351573 A1 | 5/2021 |
| EP | 3 268 821 B1 | 1/2018 |
| WO | WO-2018/132112 A1 | 7/2018 |
| WO | WO-2020/061621 A1 | 4/2020 |
| WO | WO-2022/042925 | 3/2022 |

* cited by examiner

SYSTEMS AND METHODS FOR REAL-TIME DETECTION AND COMMUNICATION OF HEALTH AND PERFORMANCE DEGRADATION IN A DISTRIBUTED BUILDING AUTOMATION NETWORK

CROSS-REFERENCE TO RELATED PATENT APPLICATIONS

This application is a continuation of U.S. patent application Ser. No. 16/153,266 filed Oct. 5, 2018 which is a continuation-in-part of U.S. patent application Ser. No. 15/342,079 filed Nov. 2, 2016, the entirety of each of these applications is incorporated by reference herein.

BACKGROUND

The present disclosure relates generally to building management systems. The present disclosure relates more particularly to systems and methods for sharing health and performance data between devices within a building management system (BMS).

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include a variety of devices (e.g., HVAC devices, controllers, chillers, fans, sensors, etc.) configured to facilitate monitoring and controlling the building space. Throughout this disclosure, such devices are referred to as BMS devices or building equipment.

In some BMS systems, there are a large numbers of devices or nodes. These nodes may all communicate via a network associated with the BMS, such as over an IP network. Further, these nodes may include intelligence, allowing each node to make decisions independent of a supervisory controller. As technology progresses, the number of intelligent nodes and devices will increase, amplifying the role of such intelligent devices and nodes in modern BMS systems.

However, as these devices perform some or all of their functions without a supervisory controller, a change in the performance of one or more of the nodes may go unnoticed until the system is adversely affected. For example, a failed actuator or sensor can result in loss of HVAC functions in a large portion of a building, potentially resulting in lost revenue. Further, in large distributed systems, it may take considerable time to determine which node has failed, further increasing the risk of downtime. Additionally, many systems require devices to have pre-established identities and/or hierarchical arrangements of the devices to properly monitor the health of the devices. Accordingly, it would be desirous to have systems and methods which can analyze the health and performance of all intelligent devices on a network in real time to provide an indication of a failing health of the device.

SUMMARY

One implementation of the present disclosure is a building device for a building management system (BMS). The building device includes a processing circuit configured to receive one or more health messages from one or more other building devices. The processing circuit is configured to update an existing health message stored in a memory of the building device based on the one or more health messages by updating a message list of the existing health message with message list data of the one or more health messages, updating a sick node list of the existing health message based on the updated message list, and updating a sick node matrix of the existing health message based on the updated sick node list and the received one or more health messages. The processing circuit is configured to communicate the updated health message to at least one of the one or more other building devices.

In some embodiments, the processing circuit is configured to generate a sick device prediction for the one or more other building devices based on at least one of the one or more health messages, the updated health message, or historical device data.

In some embodiments, the building device is configured to operate as a coordinator for a network, wherein the building device and the one or more other building devices form at least part of the network. In some embodiments, the processing circuit is configured to determine whether each of the one or more other building devices are eligible to be the coordinator based on the updated health message and update a data structure indicating which of the one or more other building devices are coordinator eligible devices based on a determination of whether each of the one or more other building devices are eligible to be the coordinator or are not eligible to be the coordinator.

In some embodiments, the building device and the one or more other building devices form at least part of a network. In some embodiments, the processing circuit is configured to perform, based on the updated health message, at least one of removing one of the one or more other building devices from the network or reducing network functionality of the one of the one or more of the other building devices.

In some embodiments, the processing circuit is configured to generate a health token for each of the one or more other building devices, wherein each health token for the one or more other building devices identifies a health state of a particular building device of the one or more other building devices and update the sick node matrix of the existing health message based on the health token of each of the one or more other building devices.

In some embodiments, the processing circuit is configured to generate the health token by determining a value for the health token based on an assurance service checklist, the checklist identifying the value for the health token based on one or more conditions each associated with a particular value for the health token and the one or more health messages.

In some embodiments, each of the one or more health messages include a message list, a sick node list, and a sick node list matrix.

In some embodiments, each sick node matrix is a binary matrix providing an indication of each of the one or more other building devices that each of the one or more other building devices has determined to be sick, based on each of the one or more other building devices evaluating the heartbeat value for each of the one or more other building devices to determine if the heartbeat value exceeds a predetermined value.

In some embodiments, the message list of one of the one or more health messages associated with one of the one or more other building devices includes a heartbeat value for each of the one or more other building devices, each heartbeat value equal to a number of messaging cycles that have occurred since the one of the one or more other building devices has received a health message from a particular building device of the one or more other building devices.

In some embodiments, the sick node list includes a sick node indication for each of the one or more other building devices, the sick node indication being activated if a particular heartbeat value for the one of the one or more other building devices exceeds a predetermined threshold.

Another implementation of the present disclosure is a method for device health monitoring in a building. The method includes receiving, by a first building device, one or more health messages from one or more other building devices. The method includes updating, by the first building device, an existing health message stored in a memory of the first building device based on the one or more health messages by updating a message list of the existing health message with message list data of the one or more health messages, updating a sick node list of the existing health message based on the updated message list, and updating a sick node matrix of the existing health message based on the updated sick node list and the received one or more health messages. The method includes communicating, by the first building device, the updated health message to at least one of the one or more other building devices.

In some embodiments, the method includes operating, by the first building device, as a coordinator for a network, wherein the first building device and the one or more other building devices form at least part of the network, determining, by the first building device, whether each of the one or more other building devices are eligible to be the coordinator based on the updated health message, and updating, by the first building device, a data structure indicating which of the one or more other building devices are coordinator eligible devices based on a determination of whether each of the one or more other building devices are eligible to be the coordinator or are not eligible to be the coordinator.

In some embodiments, the first building device and the one or more other building devices form at least part of a network. In some embodiments, the method includes performing, by the first building device based on the updated health message, at least one of removing one of the one or more other building devices from the network or reducing network functionality of the one of the one or more of the other building devices.

In some embodiments, the method further includes generating, by the first building device, a health token for each of the one or more other building devices, wherein each health token for the one or more other building devices identifies a health state of a particular building device of the one or more other building devices and updating, by the first building device, the sick node matrix of the existing health message based on the health token of each of the one or more other building devices.

In some embodiments, each of the one or more health messages include a message list, a sick node list, and a sick node list matrix.

In some embodiments, each sick node matrix is a binary matrix providing an indication of each of the one or more other building devices that each of the one or more other building devices has determined to be sick, based on each of the one or more other building devices evaluating the heartbeat value for each of the one or more other building devices to determine if the heartbeat value exceeds a predetermined value.

In some embodiments, the message list of one of the one or more health messages associated with one of the one or more other building devices includes a heartbeat value for each of the one or more other building devices, each heartbeat value equal to a number of messaging cycles that have occurred since the one of the one or more other building devices has received a health message from a particular building device of the one or more other building devices.

In some embodiments, the sick node list includes a sick node indication for each of the one or more other building devices, the sick node indication being activated if a particular heartbeat value for the one of the one or more other building devices exceeds a predetermined threshold.

Another implementation of the present disclosure is a building system for a building. The system includes one or more building devices configured to communicate one or more health messages to a first building device. The system includes the first building device. The first building device includes a processing circuit configured to receive the one or more health messages from one or more other building devices. The processing circuit is configured to update an existing health message stored in a memory of the building device based on the one or more health messages by updating a message list of the existing health message with message list data of the one or more health messages, updating a sick node list of the existing health message based on the updated message list, and updating a sick node matrix of the existing health message based on the sick node list and the received one or more health messages. The processing circuit is configured to communicate the updated health message to at least one of the one or more other building devices.

In some embodiments, the system includes an analysis platform configured to receive the updated health message from the first building device and network data from at least one of the one or more other building devices and the first building device. The analysis platform is configured to perform an analysis on at least one of the updated health message and the network data to identify a sick building device of the one or more building devices and the first building device. In some embodiments, the analysis platform is configured to perform the analysis by performing a trend analysis to identify the sick building device, identifying a digital signature associated with sick building devices to identify the sick building device, or modeling a network formed by the first building device and the one or more other building device with a network digital twin and analyzing the network digital twin to identify the sick building device.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Building Management System and HVAC System

Figure 1:
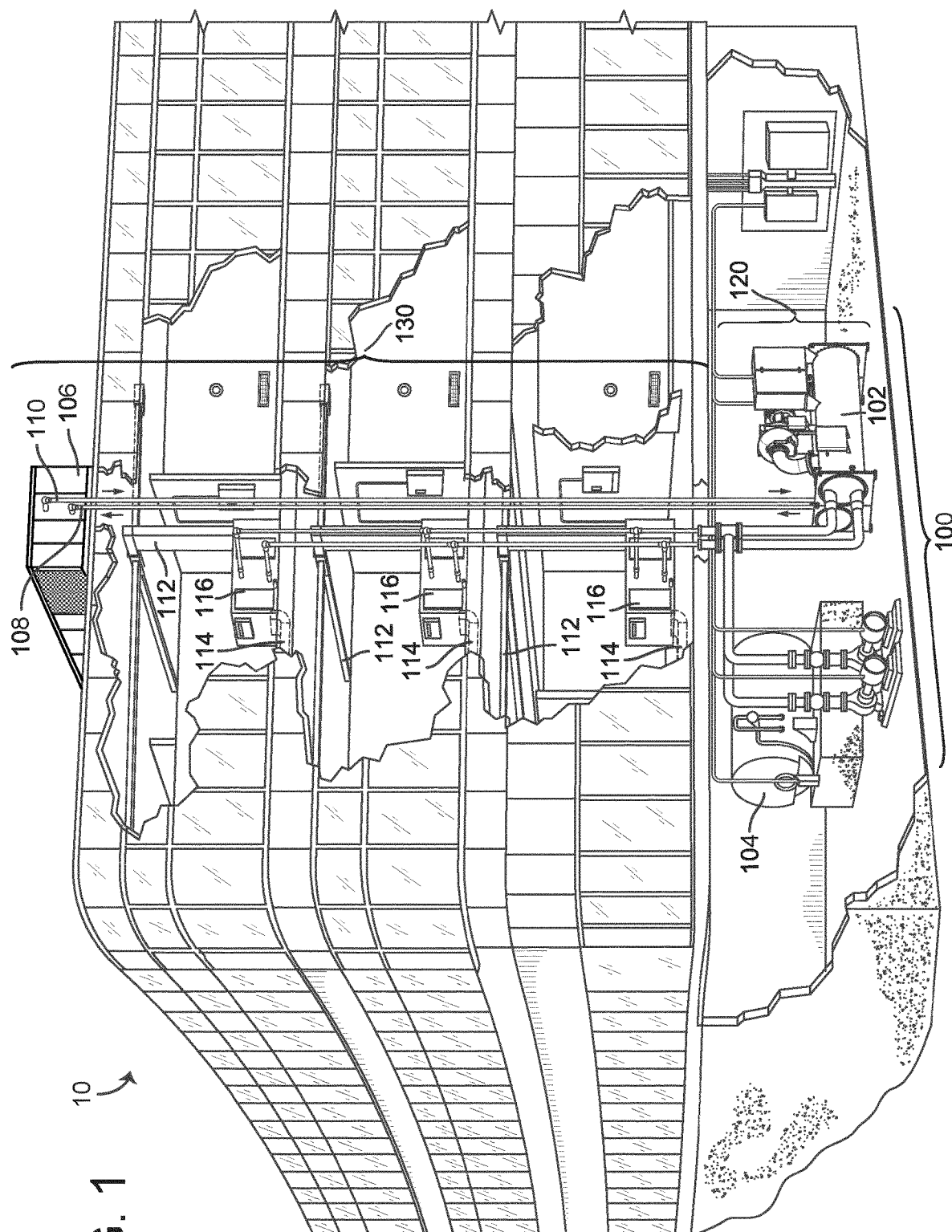
FIG. 1 is a drawing of a building equipped with a building management system (BMS) and a HVAC system, according to some embodiments.

Referring now to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
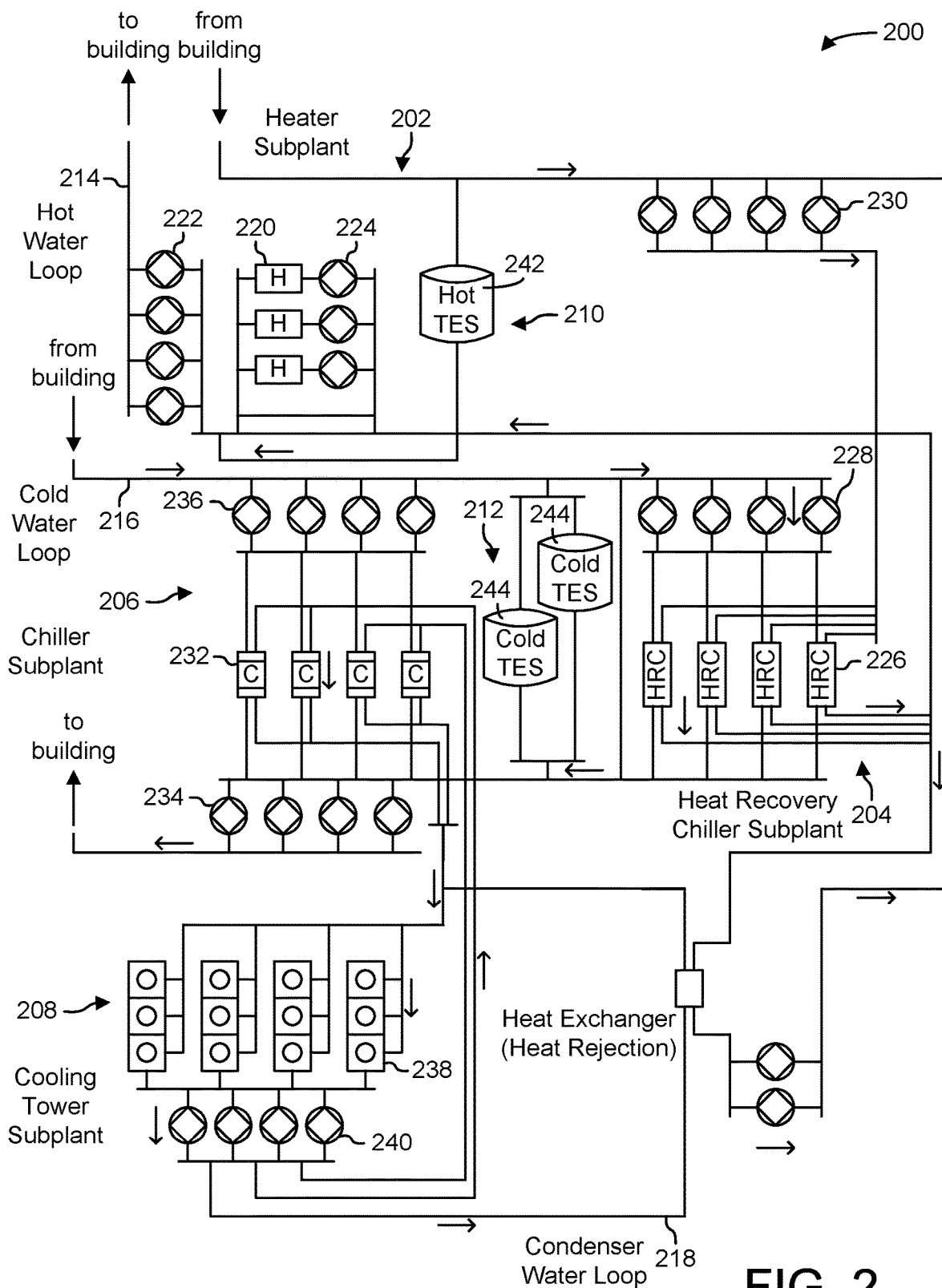
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
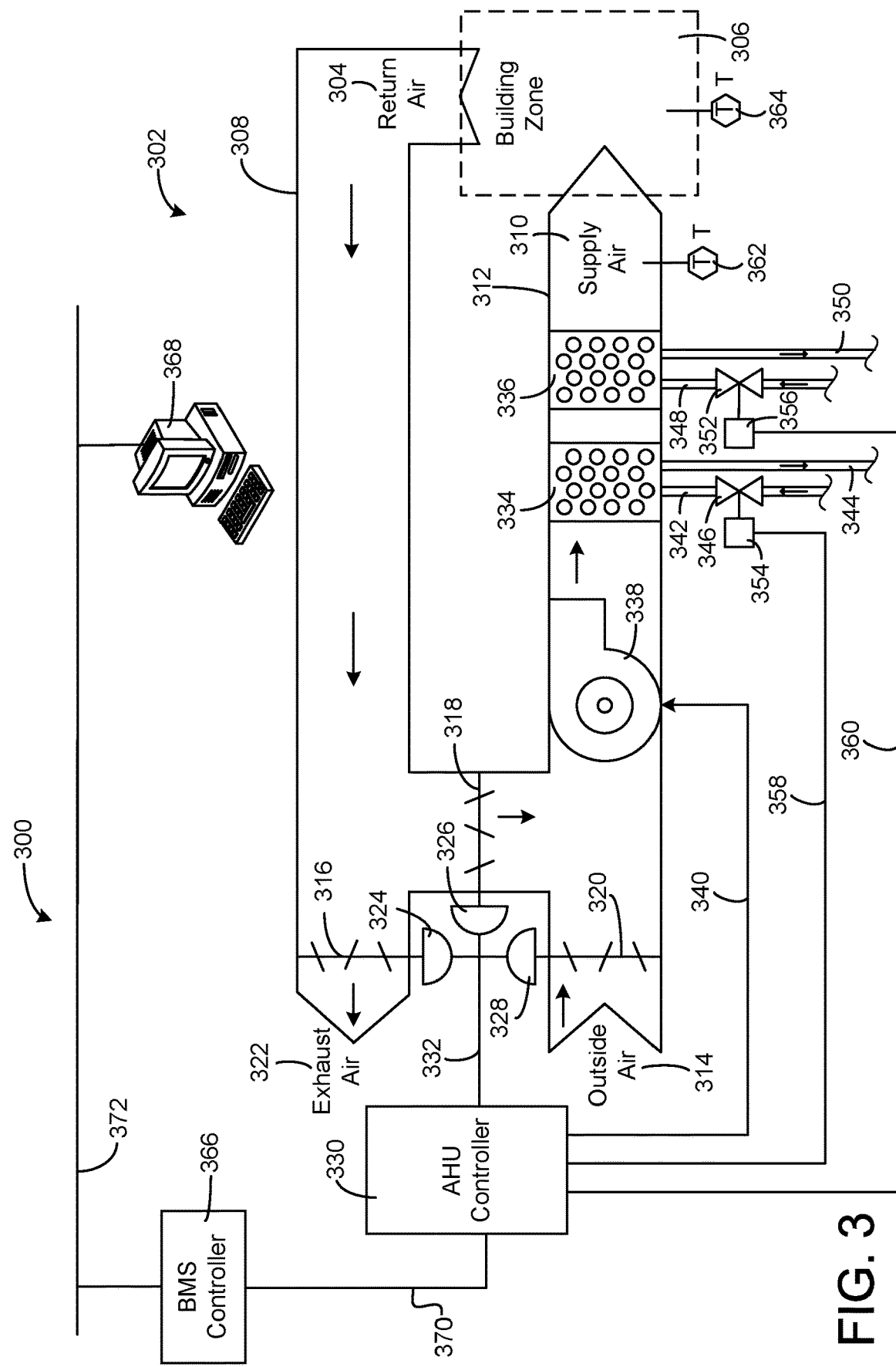
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of thereof.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
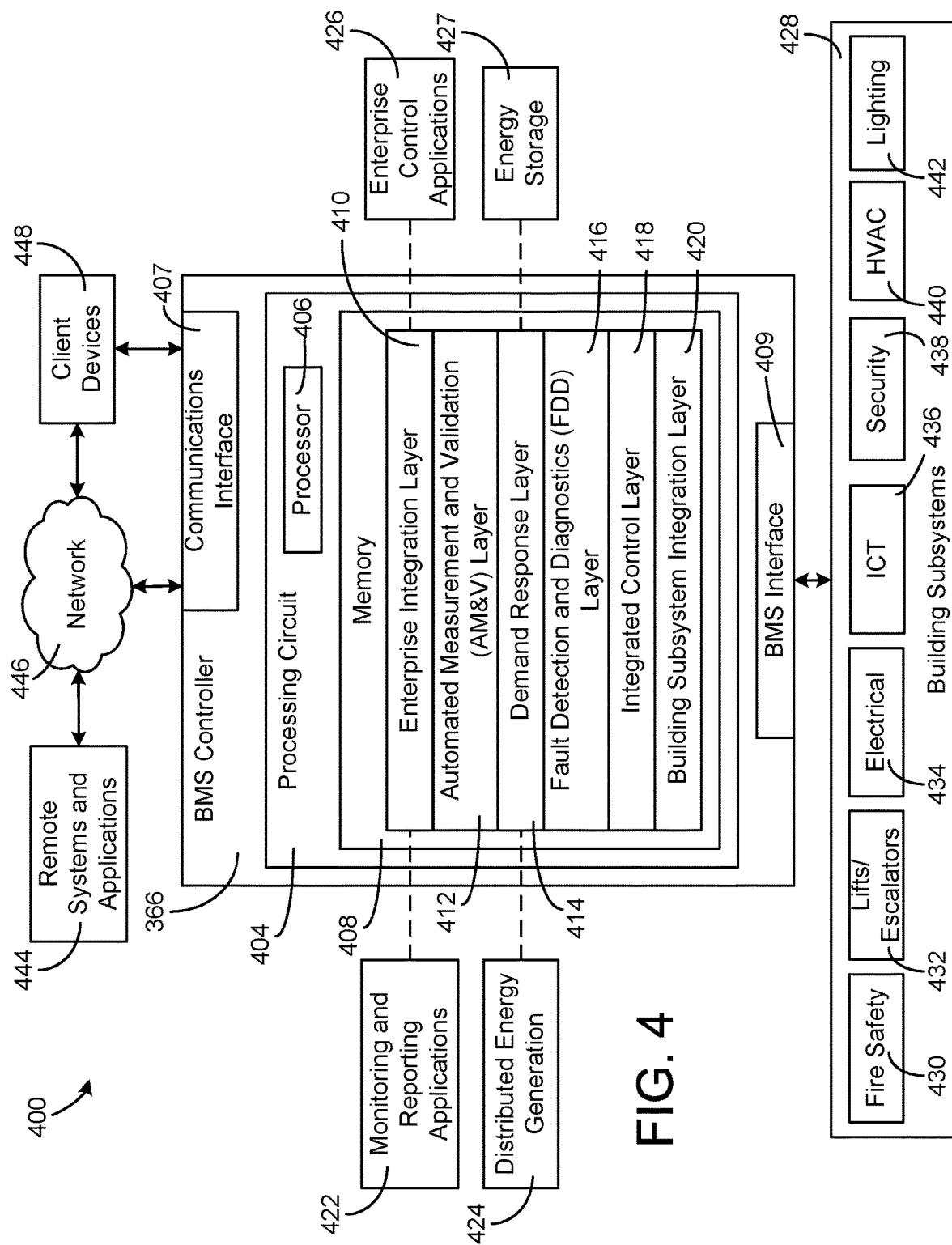
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its set-point. These processes can be examined by FDD layer 416 to expose when the system begins to degrade in performance and alert a user to repair the fault before it becomes more severe.

BMS Device Health and Performance Analysis Device

The BMS, as described above, has multiple individual components within the BMS. Example components may include control devices, such as field equipment controllers (FECs), advanced application field equipment controllers (FAC), network control engines (NCEs), input/output modules (IOMs), and variable air volume (VAV) modular assemblies. However, other control device types are contemplated. For examples, the BMS may include multiple devices such as sensors, actuators, valves, beacons, switches, thermostats, etc., which may also have integrated intelligence. For purposes of this disclosure, these controllers and devices may be referred to as "nodes." In some examples, these devices may be monitored using a centralized monitoring tool, such as a controller configuration tool (CCT) from Johnson Controls, Inc. However, in other embodiments, the nodes may form a control network allowing for distributed control of the BMS.

Figure 5:
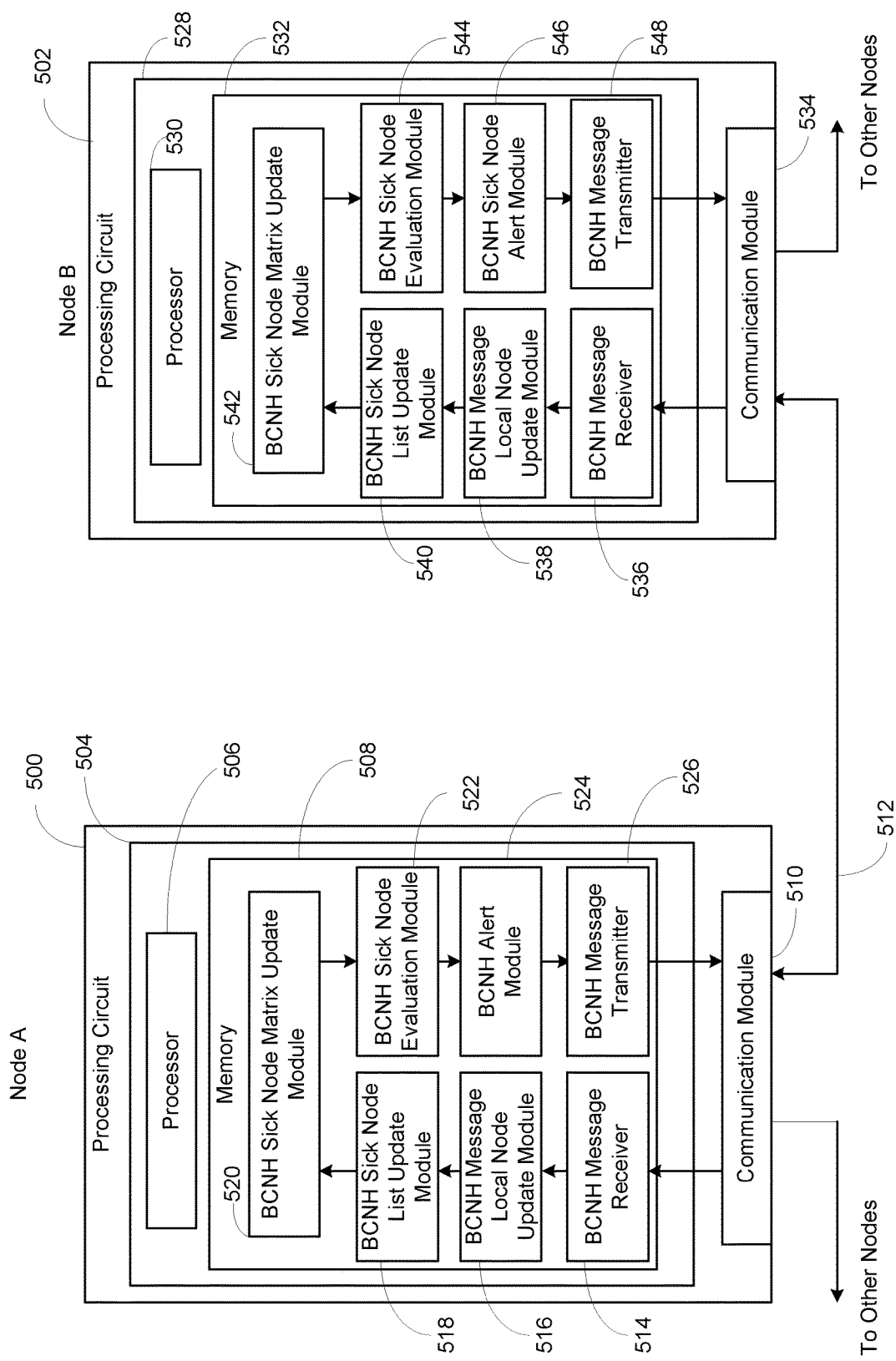
FIG. 5 is a block diagram illustrating a first device and a second device connected to a communication network, according to some embodiment.

Referring now to FIG. 5, a block diagram illustrating a first node 500 and a second node 502 is shown, according to some embodiments. In one embodiment, the nodes 500 and/or 502 may be the same type of device, such as valves, actuators, thermostats, controllers, I/O devices, etc. In other embodiments, the nodes 500 and/or 502 may be different devices. For example, the first node 500 may be an actuator and the second node 502 may be a thermostat. However, other variations are contemplated. Further, while reference to a node is generally discussed in the context of a physical device, a node may also be a logical function performed by one or more devices, and thus a node should not be construed to be limited to a physical device. In one embodiment, each node may include a unique identification number. The unique identification number can be the sole means of identifying the nodes to each other in the BMS, allowing for the true identity of each node to be masked from other nodes.

The first node 500 is shown to include a processing circuit 504. The processing circuit 504 includes a processor 506 and a memory 508. The processor 506 may be a general purpose or specific purpose processor, an application specific integrated circuit (ASIC), one or more field programmable gate arrays (FPGAs), a group of processing components, or other suitable processing components. The processor 506 may be configured to execute computer code or instructions stored in the memory 508 or received from other computer readable media (e.g., CDROM, network storage, a remote server, etc.).

The memory 508 may include one or more devices (e.g., memory units, memory devices, storage devices, etc.) for storing data and/or computer code for completing and/or facilitating the various processes described in the present disclosure. The memory 508 may include random access memory (RAM), read-only memory (ROM), hard drive storage, temporary storage, non-volatile memory, flash memory, optical memory, or any other suitable memory for storing software objects and/or computer instructions. The memory 508 may include database components, object code components, script components, or any other type of information structure for supporting the various activities and information structures described in the present disclosure. The memory 508 may be communicably connected to the processor 506 via processing circuit 504 and may include computer code for executing (e.g., by processor 504) one or more processes described herein.

The first node may further include a communication module 510. The communication module may be configured to communicate with one or more networks of the BMS, such as the network 512 shown in FIG. 5. In one embodiment, the network 512 is a wired network and communicates via wired communication protocols, such as TCP/IP, BACnet IP, BACnet MSTP, CAN, Modbus, USB, Firewire, etc. In other embodiments, the network 512 may be a wireless network communicating via one or more wireless communication protocols, such as Wi-Fi (including TCP/IP), Wi-Max, Bluetooth, LoRa, NFC, Zigbee, or other applicable wireless protocols. In one example, the communication module 510 may be a serial communication interface, such as a universal asynchronous receiver/transmitter (UART), a serial peripheral interface (SPI), an RS-485 connection, a Universal Serial Bus, (USB), or other wired communication module. The communication module 510 may further be a wireless communication module, and can include a wireless radio for sending and receiving communication via a wireless network. For example, the communication module 510 may be a Wi-Fi module, a Zigbee/Zigbee Pro module, a Bluetooth module, a LoRa module, or some combination thereof.

The first node may further include a number of modules for processing a Building Control Network Health (BCNH) message. BCNH messages are described in more detail below. The BCNH processing modules may be used to monitor and process data related to the health and performance of one or more other nodes, and will be described in more detail below. In one embodiment, the BCNH modules are executed via the processor 504 and transmit and receive data via the communication module 510 via the processing circuit 504. As shown in FIG. 5, the memory 508 can include a BCNH message receiver module 514, a BCNH message local node update module 516, a BCNH Sick Node List Update Module 518, a BCNH Sick Node Matrix Update Module 520, a BCNH Sick Node Evaluation Module 522, an Alert Module 524, and a BCNH message transmitter 526. The BCNH message receiver module 514 can receive a BCNH message from another node in the system. The BCNH message local node update module 516 can update a message list within a received BCNH message, as will be described in more detail below. The BCNH sick node list update module 518 can update a sick node list of a BCNH message associated with Node A 500. The BCNH sick node matrix update module 520 can update a sick node matrix of a BCNH message associated with Node A 500. The BCNH sick node evaluation module 522 can determine if a node is sick. In some embodiments, the BCNH sick node evaluation module 522 determines that a node is sick based on the data contained within a sick node matrix of the BCNH message, as will be described in more detail below. The BCNH alert module 524 may generate an alert based on the determination by the BCNH sick node evaluation module that a node is sick. The BCNH message transmitter 526 may transmit a BCNH message to a separate node on the network 512 via the communication module 510.

The second node may also include a processing circuit 528. The processing circuit may include a processor 530 and a memory 532. The processor 530 may be a general purpose or specific purpose processor, an application specific integrated circuit (ASIC), one or more field programmable gate arrays (FPGAs), a group of processing components, or other suitable processing components. The processor 530 may be configured to execute computer code or instructions stored in the memory 532 or received from other computer readable media (e.g., CDROM, network storage, a remote server, etc.).

The memory 532 may include one or more devices (e.g., memory units, memory devices, storage devices, etc.) for storing data and/or computer code for completing and/or facilitating the various processes described in the present disclosure. The memory 532 may include random access memory (RAM), read-only memory (ROM), hard drive storage, temporary storage, non-volatile memory, flash memory, optical memory, or any other suitable memory for storing software objects and/or computer instructions. The memory 532 may include database components, object code components, script components, or any other type of information structure for supporting the various activities and information structures described in the present disclosure. The memory 532 may be communicably connected to the processor 530 via processing circuit 528 and may include computer code for executing (e.g., by processor 530) one or more processes described herein. The second node may further include a communication module 534. In one example, the communication module 534 may be a serial communication interface, such as a universal asynchronous receiver/transmitter (UART), a serial peripheral interface (SPI), an RS-485 connection, a Universal Serial Bus, (USB), or other wired communication module. The communication module 534 may further be a wireless communication module, and can include a wireless radio for sending and receiving communication via a wireless network. For example, the communication module 534 may be a Wi-Fi module, a Zigbee/Zigbee Pro module, a Bluetooth module, a LoRa module, or some combination thereof.

The second node 502 may further include a number of modules for processing a Building Control Network Health (BCNH) message. The BCNH processing modules may be used to monitor and process data related to the health and performance of one or more other nodes, and will be described in more detail below. In one embodiment, the BCNH modules are executed via the processor 530 and transmit and receive data via the communication module 510 via the processing circuit 528. As shown in FIG. 5, the memory 532 can include a BCNH message receiver module 536, a BCNH message local node update module 538, a BCNH Sick Node List Update Module 540, a BCNH Sick Node Matrix Update Module 542, a BCNH Sick Node Evaluation Module 544, an Alert Module 546, and a BCNH message transmitter 548. The BCNH message receiver module 536 can receive a BCNH message from another node in the system. The BCNH message local node update module 538 can update a message list within a received BCNH message, as will be described in more detail below. The BCNH sick node list update module 540 can update a sick node list of a BCNH message associated with Node B 502. The BCNH sick node matrix update module 542 can update a sick node matrix of a BCNH message associated with Node B 502. The BCNH sick node evaluation module 544 can determine if a node is sick. In some embodiments, the BCNH sick node evaluation module 544 determines that a node is sick based on the data contained within a sick node matrix of the BCNH message, as will be described in more detail below. The BCNH alert module 546 may generate an alert based on the determination by the BCNH sick node evaluation module that a node is sick. The BCNH message transmitter 548 may transmit a BCNH message to a separate node on the network 512 via the communication module 534.

Figure 6:
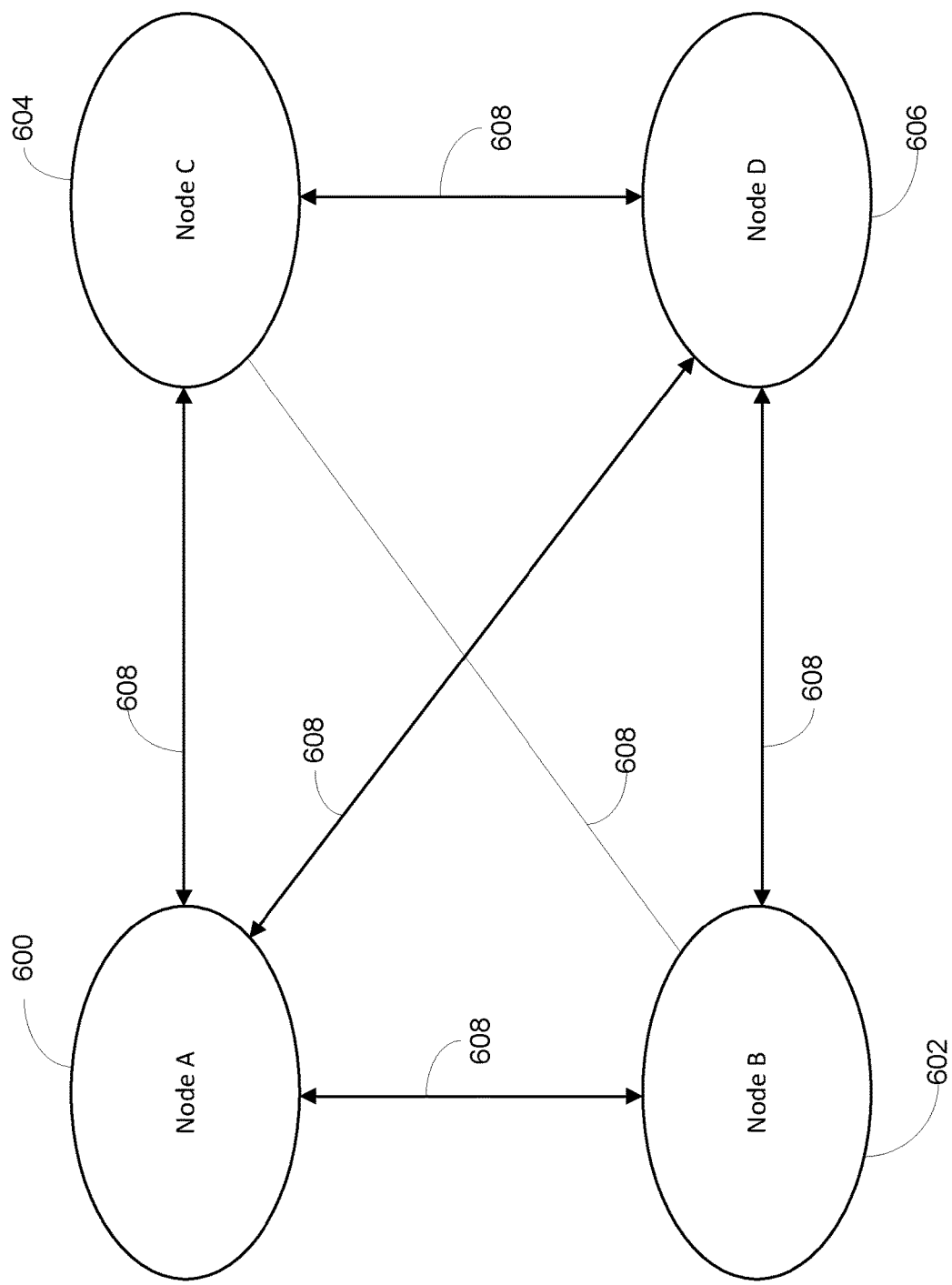
FIG. 6 is a block diagram illustrating communication between nodes in a BMS, according to some embodiment.

The first node 500 and the second node 502 may be configured to communicate with each other over the network 512 via their respective communication modules 510, 534. In some embodiments, there may be multiple other nodes in communication with the first and second nodes 500, 502. In some embodiments, multiple nodes can be arranged to form a distributed network such that each node within the system can communicate with all other nodes connected to the network. For example, FIG. 6 is a network diagram showing four individual nodes 600, 602, 604, 606 in communication via a network 608. While FIG. 6 illustrates four nodes in communication over the network 608, it is contemplated that there may be more than four nodes or fewer than four nodes. As shown in FIG. 6, each node 600, 602, 604, 606 may transmit and receive data to each of the other nodes 600, 602, 604, 606 on the network 608. For example, the node 600 indicated as Node A, may send and receive messages to Node B 602, Node C 604 and Node D 606. This connection methodology can be scalable to account for systems in which multiple nodes are utilized. Further, as each node may have a unique identifier, and will randomly send BCNH messages, the system can include new nodes without requiring a change to the previously established device population in a central server or configuration library. The nodes 600-606 can be the same as and/or similar to the nodes 500 and 502 and can be IoT devices e.g., gateways Zigbee devices, Bluetooth devices, etc.

Returning now to FIG. 5 the nodes 500, 502 may be configured to store messages received from other nodes as a data packet associated with the node the message was received from. In one embodiment, the messages are BCNH messages. The BCNH messages can include the information known about other nodes in the system, and are described in more detail below. In other embodiments, the messages transmitted and received may include status messages, health and/or performance messages, data messages, etc. In some embodiments, each node 500, 502 may send the stored messages to other nodes in the system. The messages may be sent to the other nodes randomly, as will be described below.

Figure 7:
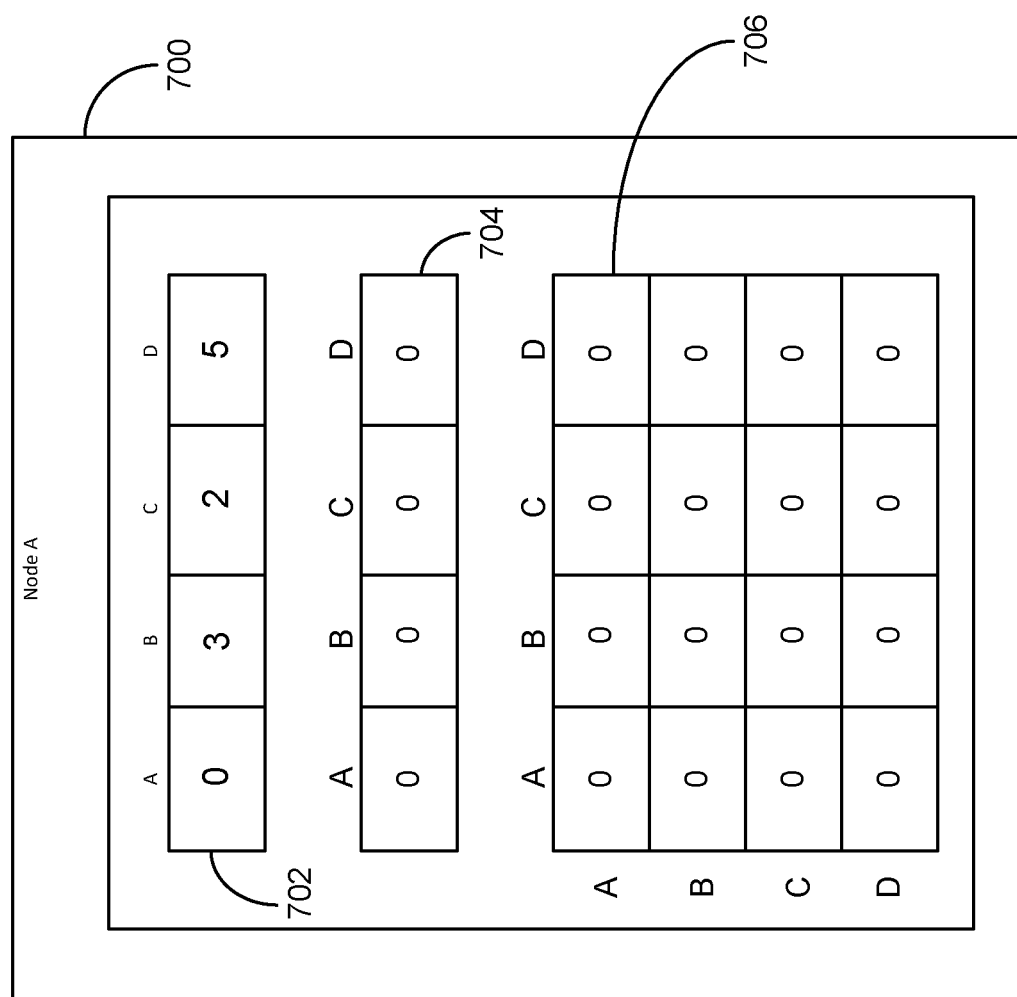
FIG. 7 is a block diagram illustrating a building control network health (BCNH) message, according to some embodiment.

Each node 500, 502 may convert the messages received from other nodes into a BCNH message. The BCNH message can be a common message sent from one node to another node over time. In some embodiments, each node 500, 502 may send a BCNH message during each messaging cycles. In some embodiments, each node 500, 502 may have an individual BCNH message. Turning now to FIG. 7, an example of a BCNH message 700 is shown, according to some embodiments. The BCNH message 700 may be associated with one of the nodes 500, 502, or any node in a BMS systems capable of processing BCNH messages. The BCNH message can include a message list 702, a sick node list 704, and a sick node matrix 706.

In one embodiment, the BCNH message 700 may be transmitted from at least one node to at least one other node during a predefined messaging cycle. Each node may transmit its BCNH message to a separate node randomly during each messaging cycle. Each node therefore receives, on average (e.g. one node may not receive a BCNH message where there are an odd number of nodes in the BMS), a BCNH message during each predefined messaging cycle. By transmitting to a node randomly each messaging cycle, the health and performance monitoring approach discussed below can be scaled linearly with any number of nodes. The messaging cycle may be configured to occur during every processing cycle of a node. For example, each node may broadcast a BCNH message during each node's individual processor cycle. In other embodiments, the nodes may transmit a BCNH message at certain intervals. For example, where all nodes in a system are tied to a single central clock, the BCNH message 700 may be transmitted at predetermined intervals. In some embodiments, each node may contain a real-time clock (RTC) which can allow for each node 500, 502 to broadcast a BCNH message 700 at a given time and/or interval. The RTCs within each node 500, 502 may be synchronized with all other nodes in the system to allow for proper timing between all nodes 500, 502 in the system. In some embodiments, the BCNH messages are broadcast during at fixed time intervals to allow for proper monitoring of the health and performance of each of the nodes in the BMS.

The message list 702 can include a heartbeat value for each node. In one embodiment, the heartbeat value indicates how many BCNH broadcasts have passed since the last BCNH message 700 has been received from a given node in the system. The heartbeat for each node is stored in the BCNH message 700 and is incremented after each BCNH broadcast. For example, in FIG. 7, the heartbeat value for Node A is shown as zero. The heartbeat value for the local node (e.g. the node in which a BCNH message 700 is being stored, is generally fixed at zero as the local node will not receive a BCNH message from itself.). The heartbeat value for Node B is three, Node C is two and Node D is five. This indicates that both Node A, as well as the previous nodes receiving BCNH message 700 have not received a BCNH message from Node B in three messaging cycles, Node C in two messaging cycles, and Node D in five messaging cycles.

The sick node list 704 may be configured to indicate if the node, in this case Node A, suspects one or more of the other nodes is sick. For purposes of this application, the term sick node is understood to mean a node experiencing a loss of performance. For example, a sick node may fail to communicate over the network. In other examples, a sick node may be a node which is unable to process data, and therefore will be unable to process a BCNH message, including transmitting a BCNH message to other nodes on the network. A node may suspect another node when the heartbeat value in the message list for a node exceeds a predefined threshold value. In embodiment, the predetermined threshold is a function of the number of nodes in the system. For example, the predefined threshold may be configured based on the size (e.g. the number of nodes) of the BMS. In some embodiments, the threshold value may be between twenty and forty rounds. However, the threshold value may be more than forty messaging rounds or less than twenty messaging rounds. The sick node list 704 may indicate that a node is suspected of being sick by placing a logic "1" into the portion of the sick node list associated with the node suspected of being sick.

The sick node matrix 706 is represented as a two-dimensional Boolean matrix listing each node which suspects a separate node as being sick. For example, if cell (C, D) is true in the sick node matrix, as shown, it implies that Node C suspects Node D to have failed or to be experiencing poor performance. Failure and/or poor performance may be associated with the Node itself, or with other devices associated with the node. In some embodiments, the sick node matrix may integrate a row for the local node (e.g. Node A as shown in FIG. 7), which is equal to the sick node list of the local node.

Figure 8:
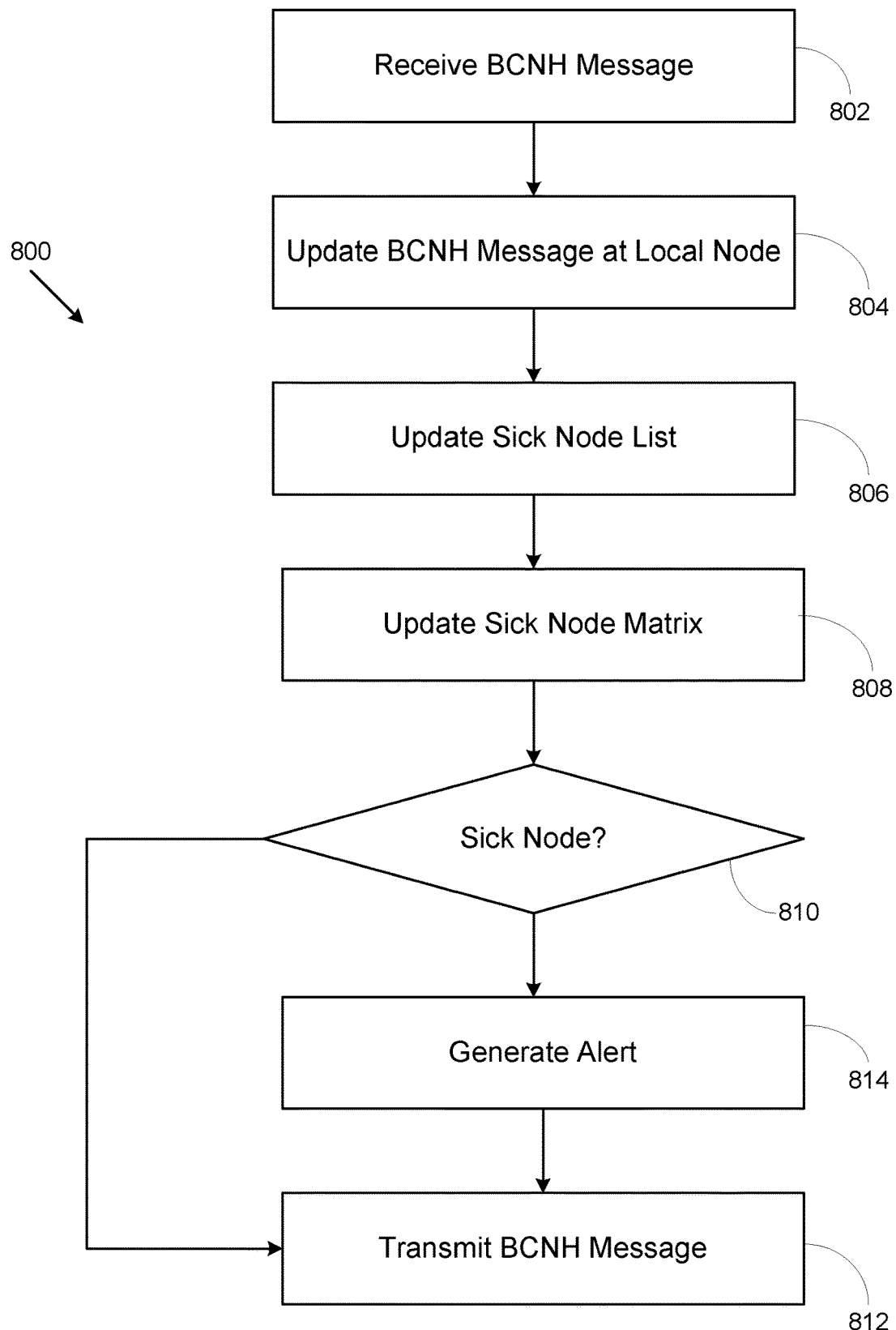
FIG. 8 is a flow chart illustrating a process for processing a BCNH message, according to some embodiments.
Figure 9:
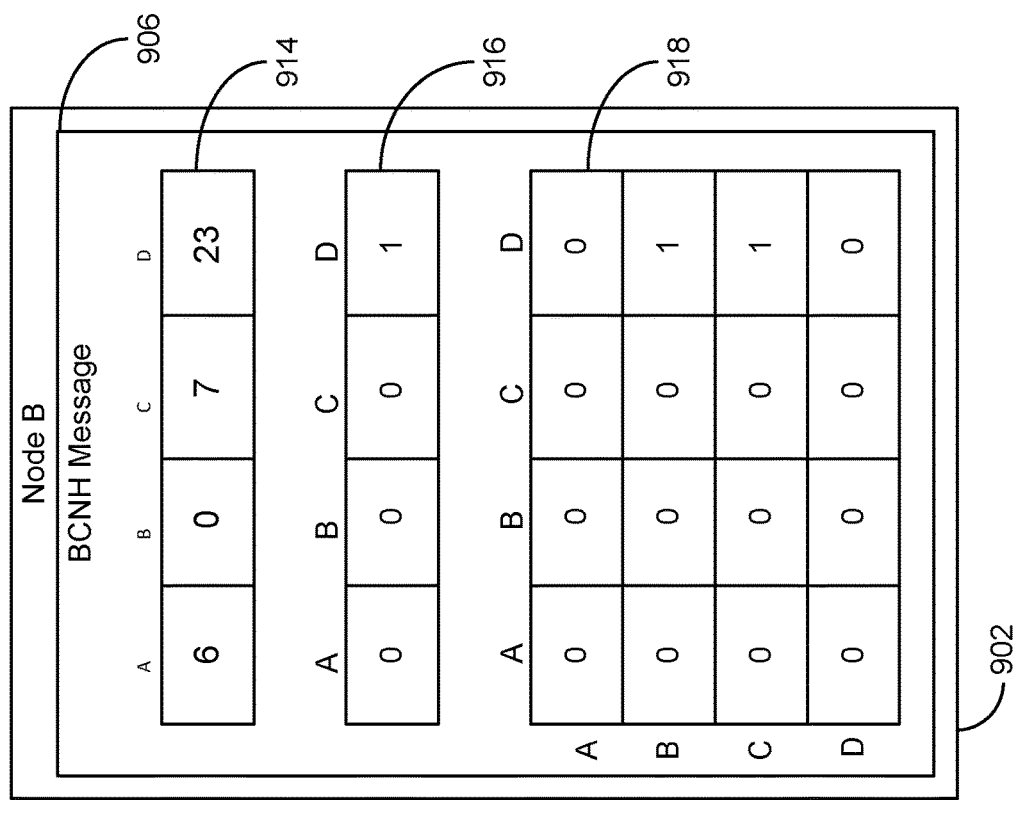
FIG. 9 is a block diagram illustrating the initial state of two separate BCNH messages, according to some embodiments.
Figure 9:
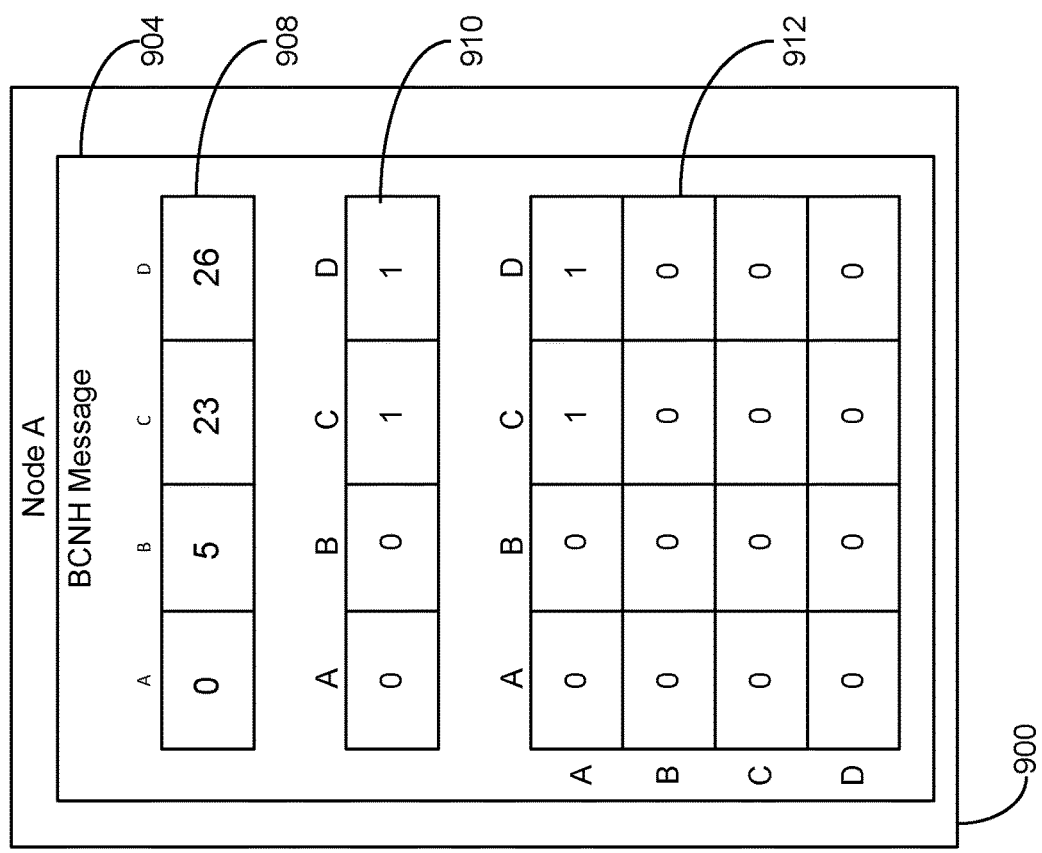

Turning now to FIG. 8, a flow chart illustrating process 800 for processing a BCNH request is shown, according to some embodiments. The process 800 can allow for the health of nodes of a BMS to be determined in real time, as each node is processing the BCNH message after each communication cycle. At process block 802, a node of the BMS receives a BCNH message. In one embodiment, the node receives the BCNH message via a BCNH message receiver module, such as BCNH message receiver module 514, 536 described above. In general, where each node of the BMS transmits a BCNH message to a random other node in the BMS, it would be expected that, generally, all nodes in the BMS will receive a BCNH message during each cycle. As described above, the BCNH message can include a BCNH message list, a sick node list, and a sick node matrix. Turning briefly to FIG. 9, initial states of two separate nodes 900, 902 BCNH messages 904, 906 are shown, according to some embodiments. The first node is shown to have a BCNH message list with heartbeat data for Node B 902, as well as Nodes "C" and "D." This indicates that Node A 900 believes that no nodes have received a message from Node B 902 in five messaging cycles, Node C in twenty-three messaging cycles, and Node D in twenty-six messaging cycles. In this example, the heartbeat threshold value is equal to twenty. However, the heartbeat threshold may be more than twenty or less than twenty, depending on the configuration of the BMS. For example, the number of nodes in the BMS may impact how the heartbeat threshold is determined.

The first node 900 further includes a sick node list 910. The sick node list 910 indicates that both Node C and Node D are suspected as being sick, indicated by the logic one in the data cells for Node C and Node D. As described above, the heartbeat threshold for this example is twenty, which is exceeded by the heartbeat value associated by Node C (twenty-three) and Node D (twenty six). Thus, Node A 900 suspects that Node C and Node D are sick. The sick node matrix 912 is shown as reflecting the sick node list 910 associated with Node A 900. However, the sick node matrix 912 of Node A 900 does not indicate that any other nodes (Nodes B, C and D) suspect any other nodes of being potentially sick.

Node B 902 further has a BCNH message list 914, a sick node list 916 and a sick node matrix 918. The BCNH message list indicates a heartbeat value of six for Node A 900, a heartbeat value of seven for Node C and a heartbeat value of twenty-three for node D. The sick node list 916 indicates that Node B 902 believes that only Node D is sick, as the heartbeat value of twenty-three for Node D exceeds the heartbeat threshold of twenty. The sick node matrix 918 indicates that Node B 902 suspects that Node D is sick. Further, the sick node matrix of Node B 902 further indicates that Node C believes that Node D is sick, as indicated by the logic "1" in cell (C, D). Thus, Node B 902 had previously received a BCNH message with a sick node matrix indicating that Node C believed Node D to be sick.

Figure 10:
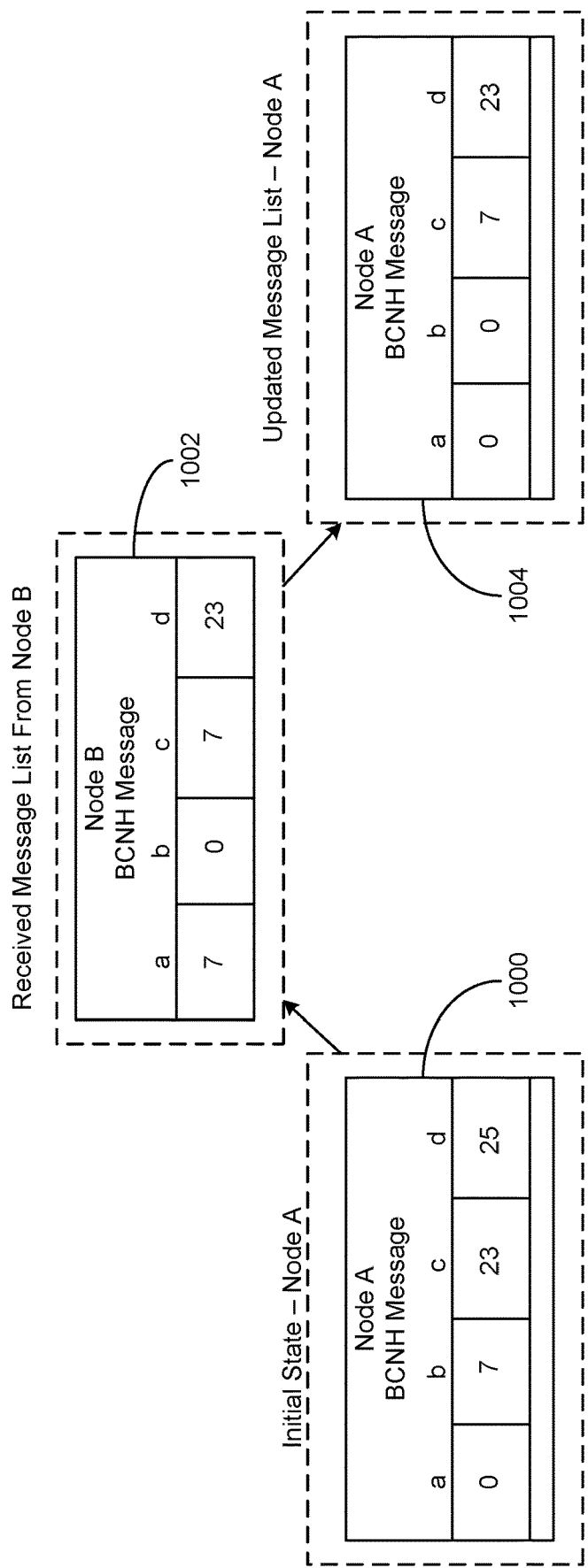
FIG. 10 is a block diagram illustrating updating a message list of a BCNH message, according to some embodiments.

Returning now to FIG. 8, at process block 804, a node updates the BCNH message list. In one embodiment, the node is configured to update the BCNH message list using a BCNH message local node update module, such as BCNH message local node update module 516, 538 described above. In some embodiments, the node may update a BCNH message list by replacing heartbeat values for each node if the received values are lower than the stored values. Turning briefly now to FIG. 10 an example of updating a message list can be seen. A message list 1000 associated with Node A is shown as being in the initial state. The initial heartbeat values are the same as those shown associated with Node A 900 in FIG. 9. Specifically, the heartbeat value associated with Node B is seven, the heartbeat message associated with Node C is twenty-three and the heartbeat message associated with Node D is 23. A message list 1002 is further shown being received from Node B. The Node B message list 1002 shows a heartbeat value of seven associated with Node A, a heartbeat value of seven associated with Node C, and a heartbeat value of twenty-three associated with Node D.

Node A, receiving the message list 1002 from Node B can update the message list 1000 to generate a message list 1004. As shown in message list 1004, the heartbeat value of Node A remains zero, as Node A is the local node and will not receive a message from itself. The heartbeat value associated with Node B is updated to zero, as the most recent BCNH message was received from Node B, and therefore zero messaging cycles have passed since a message was received from Node B. The heartbeat value of Node C is updated to a value of seven, from the initial value of twenty-three. The heartbeat value of Node C is updated to the value in message list 1002 (seven), as the heartbeat value in message list 1002 is lower than the heartbeat value associated with Node C in message list 1000. Thus, Node A is now aware that a message was received from Node C by at least one other node, seven messaging cycles ago. Finally, the heartbeat value associated with Node D is updated to the value in message list 1002 (twenty-three), as the heartbeat value in message list 1002 is lower than the heartbeat value associated with Node D in message list 1000 (twenty-five). Thus, Node A is now aware that a message was received from Node D, by at least one other node, twenty-three messaging cycles ago.

Figure 11:
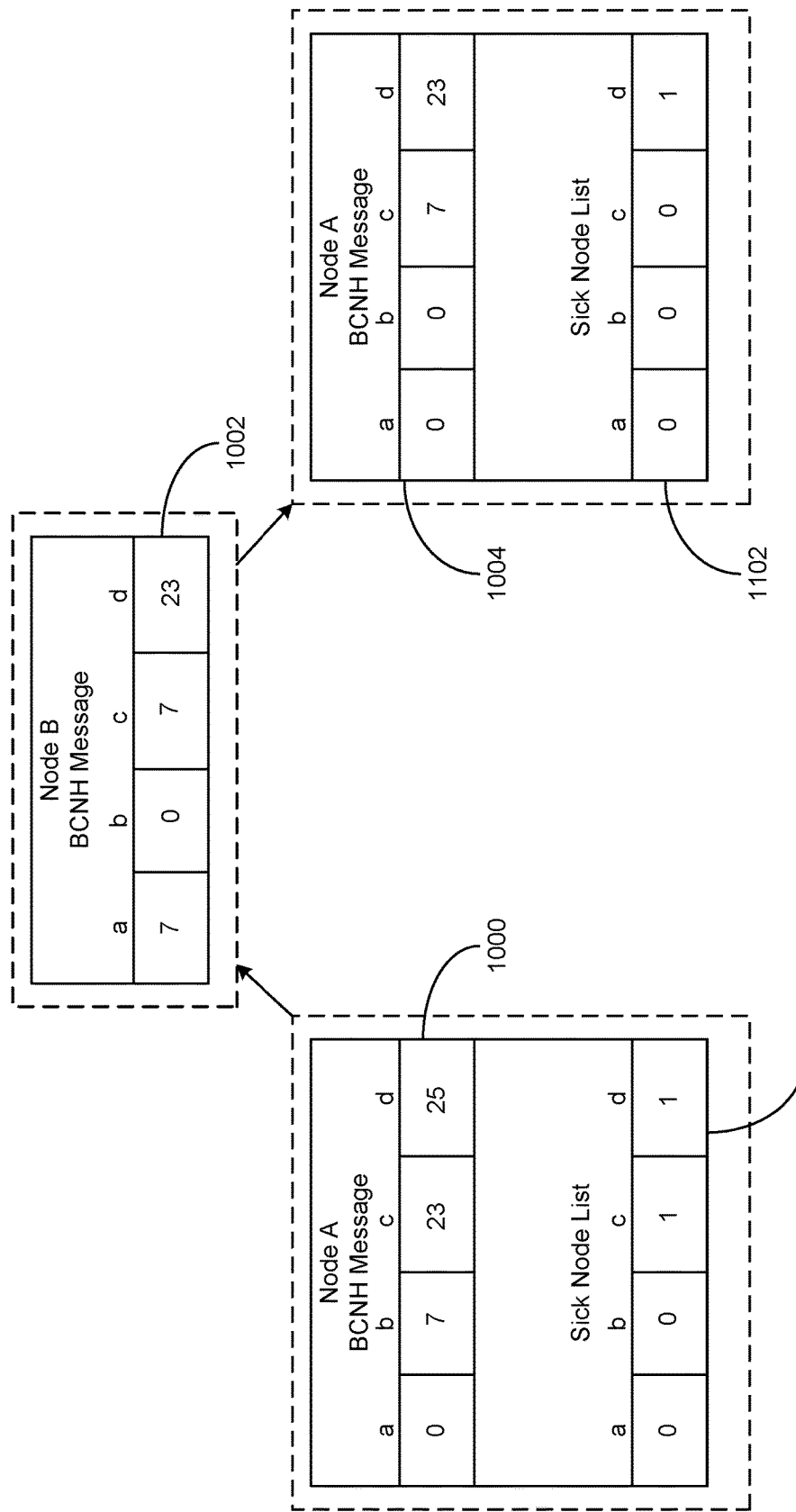
FIG. 11 is a block diagram illustrating updating a sick node list of a BCNH message, according to some embodiment.

Returning now to FIG. 8, at process block 806, the sick node list of a node is updated, based on the received BCNH message. In one embodiment, the node may be configured to update the sick node list using a BCNH sick node list update module, such as BCNH sick node list update module 518, 540, described above. For example, the node may update the sick node list based on the received message list of the BCNH message. The sick node list can be updated by assigning a logic "1" to the cell associated with the potentially sick node. For example, where the message list indicates that the heartbeat value for a given node exceeds a threshold value, a node may update the cell(s) in the sick node list to reflect that the node or nodes having heartbeat values exceeding the threshold may be sick. Turning briefly to FIG. 11, an example of updating a sick node list is shown, according to some embodiments. As shown in FIG. 11, the data values in the message list are the same as those described in FIG. 10. The sick node list 1100 of message list 1000 associated with Node A is shown to indicate that Node C and Node D are believed to potentially be sick based on the message list 1000 values. As stated above, the predetermined threshold for the present example is twenty. The heartbeat values for Node C (twenty-three) and Node D (twenty-five) both exceed this predetermined threshold. As the heartbeat values for Node C and Node D exceed the predetermined threshold, the sick node list values for each of Node C and Node D are indicated a logic "1" (TRUE). However, after receiving the message list 1002 from Node B, the message list value of Node A are updated and shown in message list 1004. Node A may then update the sick node list 1100 to indicate that only Node D is potentially sick as shown in the updated sick node list 1102, as the heartbeat value for Node D (twenty-three) is the only node heartbeat value that exceeds the predetermined threshold (twenty).

Figure 12:
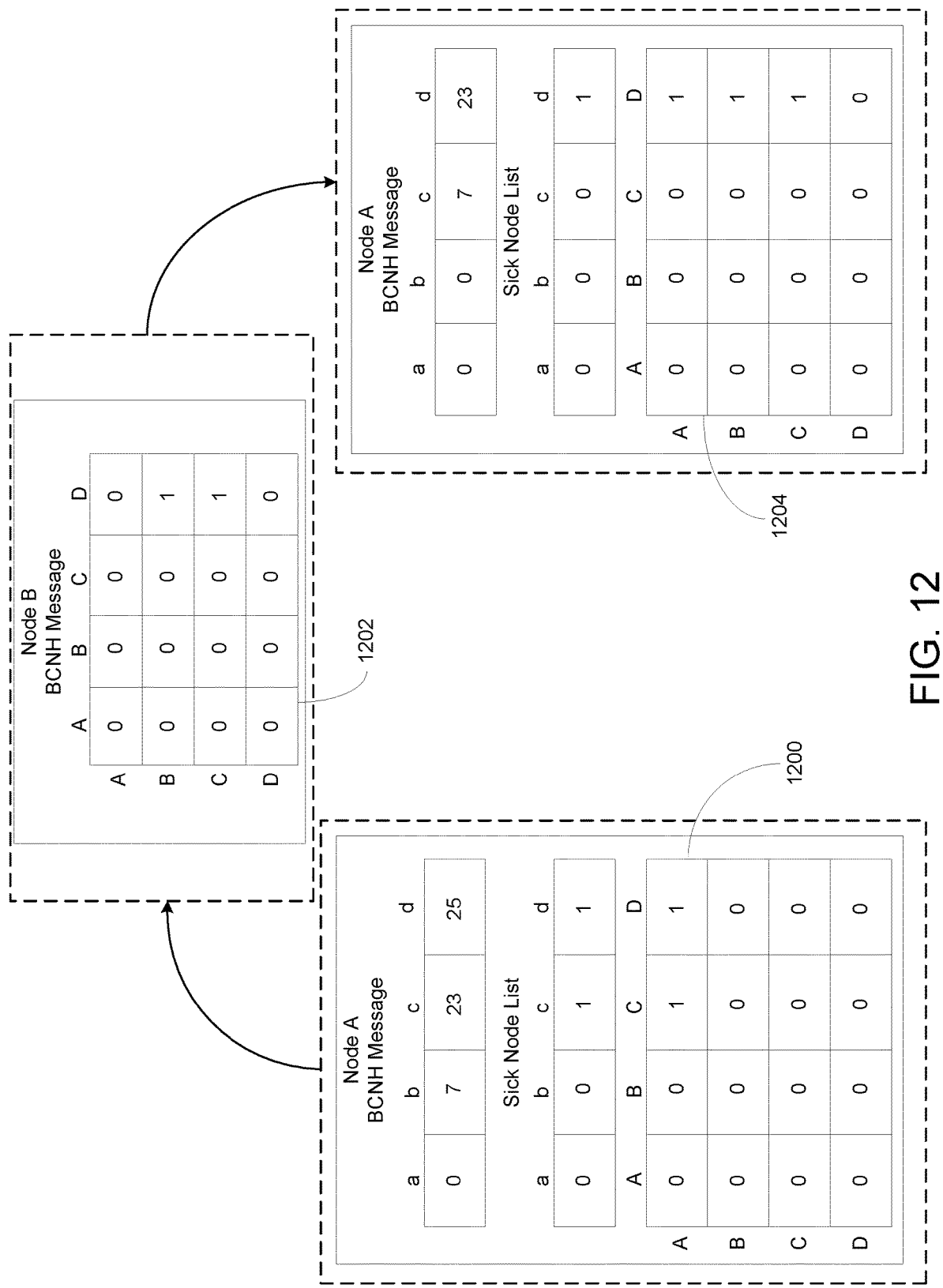
FIG. 12 is a block diagram illustrating updating a sick node matrix is shown, according to some embodiments.

Returning again to FIG. 8, at process block 808, a sick node matrix of the BCNH message is updated. In one embodiment, the node may be configured to update the sick node matrix of the BCNH message using a BCNH sick node matrix update module, such as BCNH sick node matrix update module 520, 542, described above. The sick node matrix may be updated not only based on the values in the updated sick node list, but may also be updated based on the sick node matrix within the received BCNH message. Turning now to FIG. 12, an example of updating a sick node matrix is shown, according to some embodiments. As shown in FIG. 12, the sick node matrix 1200 of Node A indicates that Node A believes that Node C and Node D are potentially sick. This mirrors the values shown in the sick node list 1100. Similar to the sick node list, nodes are noted as potentially sick in the sick node matrix 1200 by placing a logic "1" (TRUE) in the associated cell in the binary matrix. For example, Node C is believed to be sick by Node A in the initial message 1000, and is indicated as such by placing a logic "1" into cell (A, C). Similarly, Node C is believed to be sick by Node A in the initial message 1000, and is indicated as such by placing a logic "1" into cell (A, D).

Node A may then receive a BCNH message from Node B, including sick node matrix 1202. Sick node matrix 1202 is shown in FIG. 12 indicating that Node B believed that Node D is potentially sick, and also that Node C believed that Node D is potentially sick. Node A then updates the sick node matrix 1200 with the values in the Node B sick node matrix 1202. As shown in updated sick node matrix 1204, Node A updated the sick node matrix to indicate that Node D is sick as believed by Node B and Node C, and as contained in the Node B sick node matrix 1202. Further, Node A updated the sick node matrix 1204 to include its belief that Node D is sick, and removed the indication that Node C may potentially be sick, based on the data received from the Node B BCNH message list 1002. Accordingly, the updated sick node matrix 1204 of Node A indicates that Node D is believed to be potentially sick by Node A, Node B, and Node C.

Returning now to FIG. 8, at process block 810, a node can determine if another node is sick. In one embodiment, the node may be configured to use a BCNH sick node evaluation module, such as BCNH sick node evaluation module 522, 544, described above. In one embodiment, the node can check for consensus from the other nodes to determine if a node is indeed sick. For example, if the sick node matrix indicates that all nodes other than the suspected sick nodes believe a node to be sick, it can be determined that the node is indeed sick. In other embodiments, the node may find a consensus regarding the sickness of a node where a majority of other active nodes are indicated as believing the node is sick in the sick node matrix. In still further embodiments, the node may find a consensus regarding the sickness of a node where a predetermined number of active nodes indicate that they believe that a node is sick in the sick node matrix.

If no node is determined to be sick by the node, the node will transmit the updated BCNH file during the next messaging cycle at process block 812. In one embodiment, the node may be configured to transmit the BCNH message using a BCNH message transmitter, such as BCNH message transmitter 526, 548, described above. If the node does determine that a node is sick, an alert may be generated at process block 814. In one embodiment, the alert may be generated by a BCNH alert module, such as the BCNH alert module 524, 546, described above. In one embodiment, the alert may be broadcast by the node determining that another node is sick, across the BMS network. This alert may be received by all active nodes in communication with the BMS network. In some examples, multiple alerts may be broadcast during a messaging cycle, as multiple nodes may determine that a node is sick. In some embodiments, to prevent multiple alerts being broadcast simultaneously, the nodes may be programmed with identification values, and the active node with the lowest identification value which has determined that a node is sick may broadcast the alert during a messaging cycle. For example, the nodes may be configured such that the nodes transmit messages in an order based on their identification value (e.g. lowest value to highest value, or vice versa). The remaining nodes will know an alert has been sent when they receive the alert broadcast, and can refrain from broadcasting an alert relating to the node determined to be sick until after the sick node has been replaced or corrected.

Token Analysis, Coordinator and Network Management, and Analysis Platform

Figure 13:
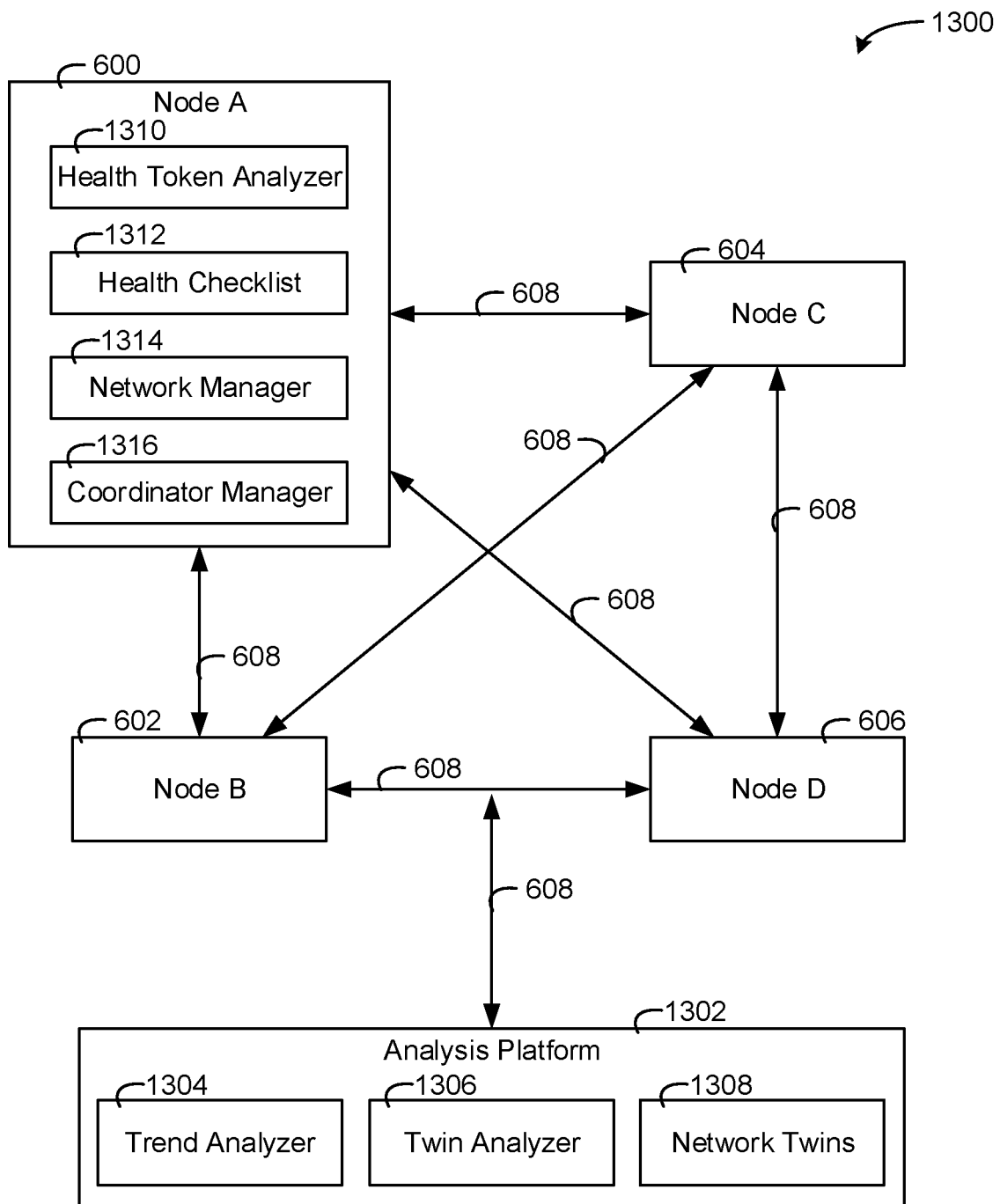
FIG. 13 is a block diagram illustrating the nodes of FIG. 6 implementing distributed health analysis and an analysis platform implementing centralized health analysis, according to an exemplary embodiment.

Referring now to FIG. 13, a system 1300 is shown including node 600, node 602, node 604, and node 606, according to an exemplary embodiment. System 300 can include number of nodes that are the same as and/or similar to the nodes 600-606 as described with reference to FIG. 6. Furthermore, system 1300 includes an analysis platform 1302. The nodes 600-606 can implement distributed analysis (e.g., analysis to determine how many nodes think a particular node is sick) via the generation of BCNH messages, however, the analysis platform 1302 can provide central intelligence on top of the distributed intelligence of the nodes 600-606.

Analysis platform 1302 can be a web server based platform e.g., MICROSOFT AZURE®, AMAZON WEB SERVICES (AWS)®, a server farm, and/or any other computing device that can include a processing circuit, processor, and/or memory e.g., that are the same as and/or similar to the processing circuits, memories, and/or processors are shown in FIGS. 4 and 5. The nodes 600-606 and the analysis platform 1302 are shown to communicate via the network 608 and can communicate and/or route health messages, commands, collected data, setpoints, timeseries data, etc.

Node 600 includes a health token analyzer 1310, a health checklist 1312, a network manager 1314, and/or a coordinator manager 1316. Health token analyzer 1310, health checklist 1312, network manager 1314, and/or coordinator manager 1316 can be executed on a processing circuit, processor, and/or stored in memory. The processing circuit, processor, and/or memory may be the same as and/or similar to processing circuit 500, processor 506, and memory 508 as described with reference to FIG. 5. Any of the nodes 602-606 and/or analysis platform 1302 can be configured to store and/or operate health token analyzer 1310, health checklist 1312, network manager 1314, and/or coordinator manager 1316.

Health token analyzer 1310 can be configured to generate health tokens for each of the nodes 602-606 based on messages (e.g., health BCNH messages as described with reference to FIG. 7 and elsewhere herein) received from the nodes 602-606. The health tokens can be data objects and/or values that indicate the health of each of the nodes 600-606 and a cause of any sickness and/or any prediction of a sickness. Health token analyzer 1310 can generate the health tokens with health checklist 1312. Health token analyzer 1310 can perform one or more conditional checks on the messages received from nodes 602-606 and/or based on operational data of node 600 itself (e.g., a self-evaluation) to determine the health tokens. Table 1 below provides exemplary health tokens and exemplary conditions of health checklist 1312 for the conditional checks.

TABLE 1

Health tokens and health check list conditions

| Health Token | Health Check List Condition |
| --- | --- |
| Device Healthy (0x00) | No health conditions met to indicate poor health? |
| Device Being Denial-of-Service (DDoS) Attacked (0x01) | Has the number of requests received by the device risen above a predefined amount? |
| Device Being Hacked (0x02) | Has a number of failed login attempts for the device risen above a predefined amount? |
| Device Corrupted (0x03) | Has a predefined number of cycles passed since receiving a message from the device? |
| Device Unreliable For Network (0x04) | Has the device dropped a predefined number of packages routed to an end device? |

Health token analyzer 1310 can collect messages and/or collect data based on its communication with nodes 602-606 to include the appropriate messages and/or data to perform the health check and/or generation of a health token for each of nodes 602-606. For example, network 608, formed by nodes 600-606 and/or analysis platform 1302 may include a coordinator and/or a router. The coordinator may be selected and/or change over time for network 608 and can be responsible for forming network 608, routing messages through network 608, and/or any other management service for network 608.

The coordinator can identify, based on messages received via network 608, if one of the nodes is dropping messages. If the node has dropped a predefined number of messages, the health token analyzer 1310 can generate the "Device Unreliable For Network" health token as shown in Table 1.

Network manager 1314 can be configured to manage the devices of the network 608. For example, network manager 1314 can select what operations each of nodes 600-606 has for network 608. For example, based on the network tokens generated for each of nodes 602-606, network manager 1314 can control message packet routing in network 608 by utilizing healthy nodes instead of unreliable nodes. For example, network manager 1314 can be configured to generate a message routing path for network 608 that uses the highest number of healthy nodes associated with the "Device Healthy" health token and uses the lowest amount of nodes (none, or a low amount) associated with a health token which indicates reduced performance of the node. For example, the network manager 1314 may need to choose between routing a package through node 602 which is associated with the "Device Healthy" token and a node 604 associated with the "Device Being Hacked" health token, network manager 1314 can be configured to route the package through node 602 to lower the possibility that the message will be dropped.

In some embodiments, the health tokens generated by health token analyzer 1310 are included in a health matrix of a health message communicated amount the nodes of network 608. For example, the health matrix as described with reference to FIG. 7, rather than or in addition to including a binary indication of the health of a node, can include the health token indicative of a cause or source of issue for a node. An exemplary health matrix is shown below in Table 2.

TABLE 2

Health Matrix with tokens

|  | Node A | Node B | Node C | Node D |
| --- | --- | --- | --- | --- |
| Node A | 0x00 | 0x01 | 0x00 | 0x00 |
| Node B | 0x00 | 0x00 | 0x00 | 0x00 |
| Node C | 0x00 | 0x00 | 0x00 | 0x00 |
| Node D | 0x00 | 0x00 | 0x00 | 0x04 |

In this regard, based on the health message update operations as discussed with reference to FIGS. 6-12, a health message can be updated to include an indication of a health token that each device has generated for each other device. In Table 2, node A believes that node B is experiencing a DDoS attack while node D has performed a self-evaluation via the health checklist 1312 and determined that it has dropped to many messages and is unreliable for network operation.

Coordinator manager 1316 can be configured to perform coordinator operations for the network 608 e.g., routing network traffic among the nodes of the network 608, creating the network 608, selecting additional coordinators or handing off the coordinator duties of the node 600 to another node of the nodes 602-606, etc. In some embodiments, the coordinator manager 1316 stores a list or other data structure of devices in the network 608 and whether each of the devices are eligible to be the coordinator. The eligibility of the devices to be a coordinator may be dependent on the hardware and/or software of each device. In this regard, the list may indicate which devices are configured to act as a coordinator. Furthermore, the list can include which devices are healthy enough to act as a coordinator. In some embodiments, based on a health matrix e.g., the health matrix as shown in Table 2, coordinator manager 1316 can be configured to determine whether a device is eligible to be a coordinator. In some embodiments, if any one of the devices have reported as health token other than healthy for the device, the device may be marked as ineligible to be a coordinator.

In some embodiments, only one of the nodes 600-606 is the coordinator at a time. In this regard, one of the nodes 600-606 may act as a coordinator while another node of the nodes 600-606 may also act as a coordinator if the first coordinator fails. In some embodiments, the coordinator changes over time based on rules or data values (e.g., token based coordinator) and/or based on messaging cycles.

In some embodiments, a coordinator can select another coordinator, or indicate the eligibility of the coordinator, based on how many nodes think a node is sick. For example, if a predefined number of nodes think a node is sick (e.g., based on a health matrix), the coordinator can set the node to not be eligible for coordinator operation.

In some embodiments, when multiple devices are marked as unhealthy, or all the devices are marked as unhealthy, the coordinator manager 1316 can still cause another device to become the coordinator, e.g., the healthiest device. For example, devices that are unreliable for network operation may be prioritized over devices that are experiencing a DDoS attack. In this regard, coordinator manager 1316 can be configured to store a prioritization list indicating the severity of each of the health tokens and can determine, based on the list and the health tokens of each device, which devices are healthiest.

Analysis platform 1302 is shown to include a trend analyzer 1304, a twin analyzer 1306, and network twins 1308. Trend analyzer 1304 can be configured to analyze nodes 600-606, forming network 608, to determine whether network 608, or a node or nodes of nodes 600-606 are unhealthy or will become unhealthy in the near future. The nodes 600-606 may form one communication family of devices, the analysis platform 1302 can be configured to collect data from and/or analyze any number of communication families. Trend analyzer 1304 can be configured to perform pattern analysis to identify whether particular patterns of activity (e.g., messages, message data, health tokens, etc.) are indicative of an unhealthy or potentially unhealthy node.

For example, trend analyzer 1304 can be configured to perform various machine learning and/or trend analysis algorithms. For example, trend analyzer 1304 can be configured to predict whether a node of nodes 600-606 and/or network 608 will become sick in the future by performing regressions, Bayesian analysis, neural networks, decision trees, support vector machines, cluster analysis, inductive logic programming, sequential pattern mining, and/or any other type of algorithm.

Trend analyzer 1304 can be configured to analyze health tokens. For example, trend analyzer 1304 can identify that for a particular node, if the node is associated with a first health token and then a second health token, there is a predefined probability that the node will become associated with a third health token. For example, if the node is associated with a "Device Unreliable For Network" token, is then associated with a "Device Being DDoS Attached" there may be a predefined probability that the node will become associated with the "Device Being Hacked" health token. This pattern may be a type of "hacking fingerprint." In this regard, if trend analyzer 1304 determines that the probability that the device will become associated with the "Device Being Hacked" health token, the trend analyzer 1304 can be configured to assign the "Device Being Hacked" health token to the node and/or raise a security alarm.

Furthermore, trend analyzer 1304 is configured to analyze performance data to identify and/or assign a health token in some embodiments. For example, trend analyzer 1304 is configured to record the number of dropped message packages over time for network 608 and/or a particular node of the nodes 600-606 in some embodiments. In this regard, trend analyzer 1304 is configured to determine, from the recorded number of dropped message packages, whether a node and/or network 608 is unhealthy in some embodiments. For example, if the rate at which messages are dropped for the network 608 spikes, i.e., it increases by a predefined rate, trend analyzer 1304 can be configured to label network 608 as sick. Furthermore, if the rate at which network packages are dropped increases by the predefined rate for a particular node, trend analyzer 1304 can assign a particular health token (e.g., the Device Healthy token) to the node.

In some embodiments, the trend analyzer 1304 can be configured to perform predictive diagnostics for the nodes 600-606 based on device similarities, e.g., sickness patterns of similar devices. For example, the trend analyzer 1304 can collect network data from the network 608 and/or nodes 600-606 and develop patterns indicative of a specific sickness, fault, and/or malfunction via machine learning. For example, a specific number of failed login attempts received every day for a week may indicate that the device is being hacked. This pattern may be referred to as a "hacking fingerprint." Based on the patterns established by the trend analyzer 1304, the trend analyzer 1304 can identify whether current operation of the nodes 600-606 is similar to an identified pattern. In this regard, the operation of the nodes 600-606 can be monitored over time. If a node 600 fits a hacking fingerprint trend, this may indicate that the device may soon be compromised by a hacker and/or there is a high level of risk that the device will be compromised. This may indicate poor health of the node even if the node has not directly been diagnosed as being hacked.

Twin analyzer 1306 and network twins 1308 can be configured to analyze and/or manage a virtual representation of nodes 600-606 and/or network 608. For example, network twins 1308 may be virtual representations of nodes 600-606 and/or network 608. Each network twin can be configured to model and/or store recorded network data for nodes 600-606 and/or network 608. Network twins 1308 can aggregate network actions, e.g., various packet routings, timings of packet routings, device health, BCNH messages, etc. The data of the network twins 1308 can be utilized by twin analyzer 1306 to predict node failures and/or preemptively assign health tokens to nodes.

Twin analyzer 1306 can be configured to collect the data from the network 608 and maintain (e.g., generate) and/or update (e.g., add new data) to the network twins 1308. Twin analyzer 1306 can be configured to utilize network twins 1308 to perform various machine learning and/or analysis predictions. Network twins 1308 may be the same as and/or similar to the smart entities as described with reference to U.S. Provisional Application No. 62/564,247 filed Sep. 27, 2017, U.S. Provisional Application No. 62/611,974 filed Dec. 29, 2017, and U.S. Provisional Application No. 62/611,984 filed Dec. 29, 2017, the entirety of each of these applications is incorporated by reference herein.

Figure 14:
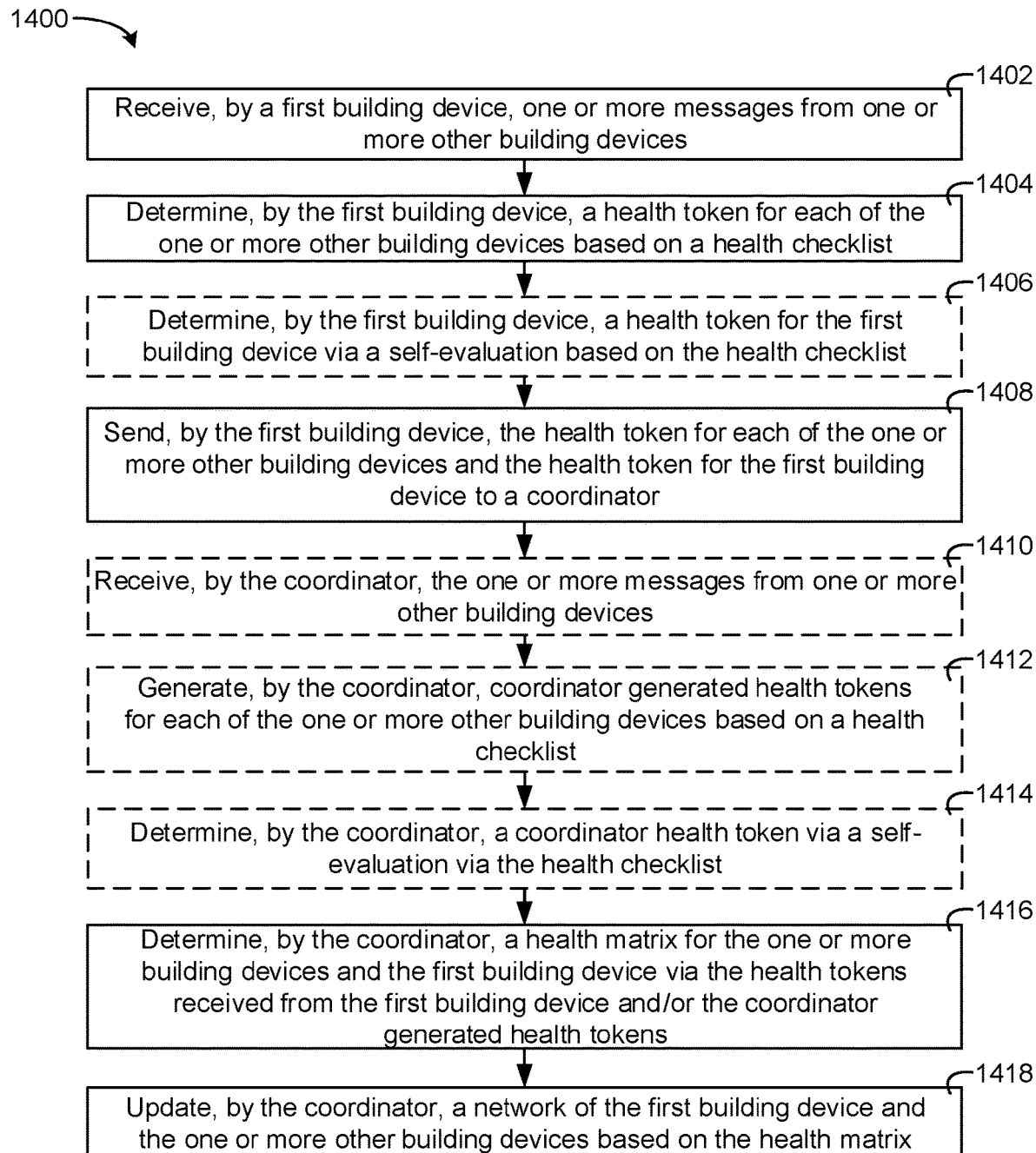
FIG. 14 is a flow diagram of a process for implementing token based health analysis of the nodes of FIG. 13, according to an exemplary embodiment.

Referring now to FIG. 14, a process 1400 of generating a health matrix with health tokens is shown, according to an exemplary embodiment. Nodes 600-606 can each be configured to perform the process 1400. Furthermore, analysis platform 1302 can be configured to perform the process 1400. Any computing device as described herein can be configured to perform the process 1400.

In step 1402, a first building device can receive one or more messages from one or more other building devices. For example, node 602 can receive various health messages (e.g., BCNH messages), data messages, status information, and/or any other information from nodes 600, 604, and 606. In some embodiments, the message is a health message, e.g., the BCNH message as shown in FIG. 7. In some embodiments, the message is a packet being routed through network 608. Furthermore, the data could be an indication of a number of invalid login attempts, an indication of a number of dropped message packages, etc.

In step 1404, the first building device can determine a health token for each of the one or more other building devices based on a health checklist. For example, node 602, based on the received messages and/or network data of step 1402, can determine a health token for each of the nodes 600, 604, and 606. In some embodiments, the checklist is health checklist 1312 and/or the health tokens are determined from the health checklist 1312. For example, Table 1 provides an indication of health checklist 1312 and possible health tokens. In some embodiments, there may be one or multiple health checklists 1312 that can be updated (e.g., appended with new rules) over time.

In step 1406, the first building device determines a health token for itself, the first device, via a self-evaluation based on the health checklist. For example, node 602 can store data indicative of its network performance (e.g., number of invalid login attempts, number of dropped packages, etc.) and can compare the data to health checklist 1312 to determine a health token.

In step 1408, the first building device can send the health token for each of the one or more other building devices and the health token for the first building device to a coordinator device. The coordinator device can be the node 600 and can be configured to perform special network operation (e.g., packet routing, job selection, network forming, etc.). In some embodiments, the health tokens are sent to the coordinator as part of a health message as described with reference to FIG. 7.

In step 1410, the coordinator can receive the messages from the devices, the messages of step 1402. In this regard, rather than, or in addition to, receiving health tokens from the other devices, the coordinator itself can generate the health tokens based on the messages. In step 1412, the coordinator can generate coordinator generated health tokens for each of the one or more other building devices based on the health checklist and in step 1414, the coordinator can generate a coordinator health token for the coordinator based on a self-evaluation. Steps 1410-1414 can be the same as and/or similar steps 1402-1406 but performed by the coordinator.

In step 1416, the coordinator can determine a health matrix for the one or more building devices and the first building device via the health tokens received from the first building device and/or based on the coordinator generated health tokens. In this regard, the coordinator can receive multiple health tokens from various devices, e.g., from each of multiple nodes. For example, if node 600 is the coordinator, the node 600 can receive a health token from each of the nodes 602-606. In this regard, node 600 can understand what each of the nodes 600-606 believes is the status of each of the other nodes, and can thus generate a health matrix, e.g., the health matrix of Table 1.

In step 1418, the coordinator, can perform various updates to network 408 and the nodes forming the network. For example, node 600 can perform various operations that increase the operation of the network 408. For example, node 600 can select another coordinator of the network for the node 600 to hand coordinator duties over to. For example, node 600 can select, or update the eligibility, of the other nodes based on the health matrix generated in the step 1416. Furthermore, in some embodiments, the coordinator can update the routes of packages of network 608. For example, the coordinator can set some nodes to be avoided and/or cause messages to be routed through network 608 in such a manner that sick nodes are avoided.

In some embodiments, node 600 can drop certain nodes from network 608. For example, node 600 can cause the sick node to be ignored in message routing and/or operation. However, in some embodiments, the sick node can be kept with limited functionality. For example, the sick node can still be communicated to by other nodes but is limited in its functionality, e.g., it does not server a coordinator or is not used to route messages.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building system of a building comprising:
one or more memory devices storing instructions thereon that, when executed by one or more processors, cause the one or more processors to:
receive network data from a plurality of building devices of a network of the building;
update a digital building network twin to include the network data, the digital building network twin providing a virtual representation of the network and the plurality of building devices; and
perform an analysis on the digital building network twin to predict failures of the plurality of building devices based on the network data and the virtual representation of the network and the plurality of building devices.

2. The building system of claim 1, wherein the digital building network twin comprises a plurality of entities representing the plurality of building devices and a plurality of relationships between the plurality of entities indicating relationships between the plurality of building devices.

3. The building system of claim 1, wherein the network data comprises at least one of network packet routings, packet routing timings, or device health messages.

4. The building system of claim 1, wherein the network data comprises one or more health messages;
wherein the building system further comprises a building device configured to:
receive the one or more health messages from one or more other building devices of the plurality of building devices;
update an existing health message stored in a memory of the building device based on the one or more health messages; and
communicate the updated health message to at least one of the one or more other building devices.

5. The building system of claim 4, wherein the building device is configured to update the existing health message by:
updating a message list of the existing health message with message list data of the one or more health messages;
updating a sick node list of the existing health message based on the message list; and
updating a sick node matrix of the existing health message based on the updated sick node list and the one or more health messages.

6. The building system of claim 5, wherein the building device is configured to generate a sick device prediction for the one or more other building devices based on at least one of the one or more health messages, the updated health message, or historical device data.

7. The building system of claim 5, wherein the building device is configured to operate as a coordinator for the network, wherein the building device and the one or more other building devices form at least part of the network;
wherein the building device is configured to:
determine whether each of the one or more other building devices are eligible to be the coordinator based on the updated health message; and
update a data structure indicating which of the one or more other building devices are coordinator eligible devices based on a determination of whether each of the one or more other building devices are eligible to be the coordinator or are not eligible to be the coordinator.

8. The building system of claim 5, wherein the building device and the one or more other building devices form at least part of the network;
wherein the building device is configured to perform, based on the updated health message, at least one of removing one of the one or more other building devices from the network or reducing network functionality of the one of the one or more other building devices.

9. The building system of claim 5, wherein the building device is configured to:
generate a health token for each of the one or more other building devices, wherein the health token for each of the one or more other building devices identifies a health state of a particular building device of the one or more other building devices; and
update the sick node matrix of the existing health message based on the health token of each of the one or more other building devices.

10. The building system of claim 9, wherein the building device is configured to generate the health token by determining a value for the health token based on an assurance service checklist, the assurance service checklist identifying the value for the health token based on one or more conditions each associated with a particular value for the health token and the one or more health messages.

11. The building system of claim 5, wherein each of the one or more health messages comprise a message list, a sick node list, and a sick node list matrix.

12. The building system of claim 11, wherein each sick node matrix is a binary matrix providing an indication of each of the one or more other building devices that each of the one or more other building devices has determined to be sick, based on each of the one or more other building devices evaluating a heartbeat value for each of the one or more other building devices to determine if the heartbeat value exceeds a predetermined value.

13. The building system of claim 11, wherein the message list of one of the one or more health messages associated with one of the one or more other building devices comprises a heartbeat value for each of the one or more other building devices, each heartbeat value equal to a number of messaging cycles that have occurred since the one of the one or more other building devices has received a health message from a particular building device of the one or more other building devices.

14. The building system of claim 11, wherein the sick node list comprises a sick node indication for each of the one or more other building devices, the sick node indication being activated if a particular heartbeat value for the one of the one or more other building devices exceeds a predetermined threshold.

15. A method for a building comprising:
receiving, by one or more processing circuits, network data from a plurality of building devices of a network of the building;
updating, by one or more processing circuits, a digital building network twin to include the network data, the digital building network twin providing a virtual representation of the network and the plurality of building devices; and
performing, by one or more processing circuits, an analysis on the digital building network twin to predict failures of the plurality of building devices based on the network data and the virtual representation of the network and the plurality of building devices.

16. The method of claim 15, wherein the digital building network twin comprises a plurality of entities representing the plurality of building devices and a plurality of relationships between the plurality of entities indicating relationships between the plurality of building devices.

17. The method of claim 15, wherein the network data comprises at least one of network packet routings, packet routing timings, or device health messages.

18. The method of claim 15, wherein the network data comprises one or more health messages;
wherein the method further comprises:
receiving, by one or more processing circuits, the one or more health messages from one or more other building devices of the plurality of building devices;
updating, by one or more processing circuits, an existing health message stored in a memory of the building device based on the one or more health messages; and
communicating, by one or more processing circuits, the updated health message to at least one of the one or more other building devices.

19. The method of claim 18, wherein the updating, by one or more processing circuits, the existing health message comprises:
updating a message list of the existing health message with message list data of the one or more health messages;
updating a sick node list of the existing health message based on the message list; and
updating a sick node matrix of the existing health message based on the updated sick node list and the one or more health messages.

20. A building device of a building comprising:
one or more memory devices storing instructions thereon; and
one or more processors that execute the instructions, wherein the instructions cause the one or more processors to:
receive network data from a plurality of building devices of a network of the building;
update a digital building network twin to include the network data, the digital building network twin providing a virtual representation of the network and the plurality of building devices; and
perform an analysis on the digital building network twin to predict failures of the plurality of building devices based on the network data and the virtual representation of the network and the plurality of building devices.

* * * * *